(12) United States Patent
Wang et al.

(10) Patent No.: US 11,308,675 B2
(45) Date of Patent: Apr. 19, 2022

(54) 3D FACIAL CAPTURE AND MODIFICATION USING IMAGE AND TEMPORAL TRACKING NEURAL NETWORKS

(71) Applicant: Intel Corporation, Santa Clara, CA (US)

(72) Inventors: Shandong Wang, Beijing (CN); Ming Lu, Beijing (CN); Anbang Yao, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/971,132

(22) PCT Filed: Jun. 14, 2018

(86) PCT No.: PCT/CN2018/091219
§ 371 (c)(1),
(2) Date: Aug. 19, 2020

(87) PCT Pub. No.: WO2019/237299
PCT Pub. Date: Dec. 19, 2019

(65) Prior Publication Data
US 2021/0104086 A1    Apr. 8, 2021

(51) Int. Cl.
*G06T 13/40* (2011.01)
*G06N 3/08* (2006.01)
(Continued)

(52) U.S. Cl.
CPC .......... *G06T 13/40* (2013.01); *G06K 9/00268* (2013.01); *G06K 9/00711* (2013.01);
(Continued)

(58) Field of Classification Search
CPC ..... G06T 13/40; G06T 19/20; G06K 9/00268; G06K 9/00711; G06K 9/6256; G06N 3/0454; G06N 3/08
(Continued)

(56) References Cited

U.S. PATENT DOCUMENTS

| | | |
|---|---|---|
| 2010/0189342 A1 | 7/2010 | Parr et al. |
| 2014/0009465 A1 | 1/2014 | Shen et al. |

(Continued)

FOREIGN PATENT DOCUMENTS

| | | |
|---|---|---|
| CN | 106600667 | 4/2017 |
| CN | 107067429 | 8/2017 |
| CN | 107292950 | 10/2017 |

OTHER PUBLICATIONS

Guo Y, Cai J, Jiang B, Zheng J. Cnn-based real-time dense face reconstruction with inverse-rendered photo-realistic face images. IEEE transactions on pattern analysis and machine intelligence. May 17, 2018;41(6):1294-307.*

(Continued)

*Primary Examiner* — Hai Tao Sun
(74) *Attorney, Agent, or Firm* — Essential Patents Group, LLP.

(57) ABSTRACT

Techniques related to capturing 3D faces using image and temporal tracking neural networks and modifying output video using the captured 3D faces are discussed. Such techniques include applying a first neural network to an input vector corresponding to a first video image having a representation of a human face to generate a morphable model parameter vector, applying a second neural network to an input vector corresponding to a first and second temporally subsequent to generate a morphable model parameter delta vector, generating a 3D face model of the human face using the morphable model parameter vector (Continued)

and the morphable model parameter delta vector, and generating output video using the 3D face model.

20 Claims, 9 Drawing Sheets

(51) Int. Cl.
  *G06T 19/20* (2011.01)
  *G06K 9/00* (2006.01)
  *G06K 9/62* (2022.01)
  *G06N 3/04* (2006.01)
(52) U.S. Cl.
  CPC ......... *G06K 9/6256* (2013.01); *G06N 3/0454* (2013.01); *G06N 3/08* (2013.01); *G06T 19/20* (2013.01); *G06T 2210/44* (2013.01); *G06T 2219/2021* (2013.01)
(58) Field of Classification Search
  USPC .......................................................... 345/419
  See application file for complete search history.

(56) References Cited

U.S. PATENT DOCUMENTS

| | | | |
|---|---|---|---|
| 2018/0197330 A1* | 7/2018 | Wang | G06T 17/00 |
| 2019/0205700 A1* | 7/2019 | Gueguen | G06K 9/2054 |
| 2019/0228556 A1 | 7/2019 | Wang et al. | |

OTHER PUBLICATIONS

Zollhöfer M, Thies J, Garrido P, Bradley D, Beeler T, Pérez P, Stamminger M, Nießner M, Theobalt C. State of the art on monocular 3D face reconstruction, tracking, and applications. In Computer Graphics Forum May 2018 (vol. 37, No. 2, pp. 523-550).*
International Search Report and Written Opinion for PCT Application No. PCT/CN2018/091219, dated Mar. 18, 2019.
He, K. et al., "Deep Residual Learning for Image Recognition", IEEE Conference on Computer Vision and Pattern Recognition, 2016, 9 pages.
Krizhevsky, A. et al.,"ImageNet Classification with Deep Convolutional Neural Networks", In Advances in Neural Information Processing systems (NIPS); pp. 1-9; 2012.
Parkhi, et al.,"Deep face recognition", British Machine Vision Conference, 2015.
Richardson, et al., "Learning Detailed Face Reconstruction from a Single Image", CVPR 2017.
Tewari, et al., "MoFA: Model-based Deep Convolutional Face Autoencoder for Unsupervised Monocular Reconstruction", ICCV 2016.
Thies, et al., "Face2Face: Real-time Face Capture and Reenactment of RGB Videos", CVPR 2016.
Wang, et al.,"Realtime 3D Eye Gaze Animation Using a Single RGB Camera", SIGGRAPH 2016.
International Preliminary Report on Patentability for PCT Application No. PCT/CN2018/091219, dated Dec. 24, 2020.

* cited by examiner

3D FACIAL CAPTURE AND MODIFICATION USING IMAGE AND TEMPORAL TRACKING NEURAL NETWORKS

CLAIM OF PRIORITY

This Application is a National Stage Entry of, and claims priority to, PCT Application No. PCT/CN2018/091219, filed on 14 Jun. 2018 and titled "3D FACIAL CAPTURE AND MODIFICATION USING IMAGE AND TEMPORAL TRACKING NEURAL NETWORKS", which is incorporated by reference in its entirety for all purposes.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
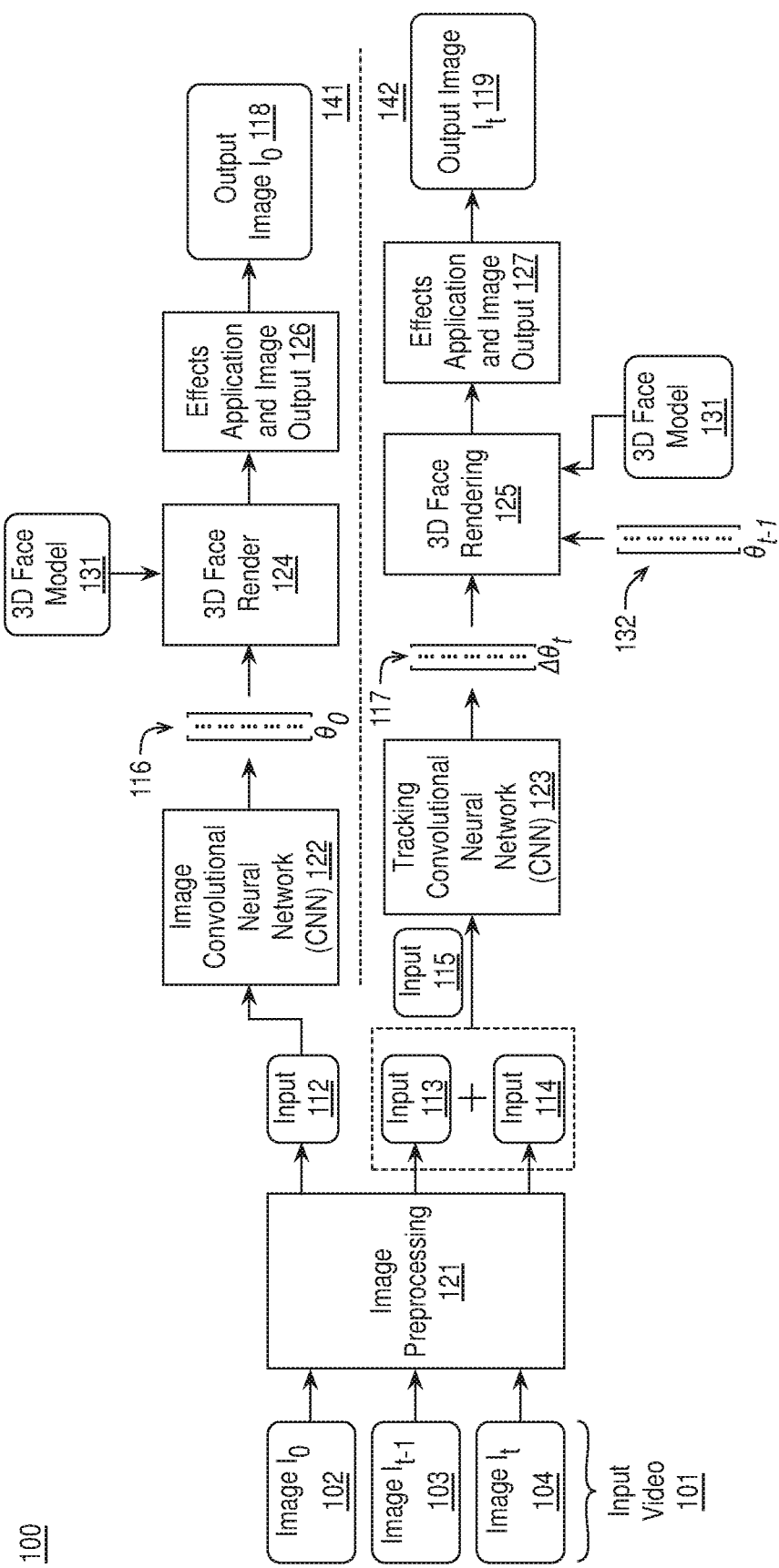
FIG. 1 illustrates an example system for capturing 3D faces and applying effects based on the captured 3D faces.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation". "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to capturing parameters for a 3D face model from video and modifying the video based on the rendered 3D face model.

As described above, it may be desirable to capture or estimate a 3D face shape and texture by determining parameters of a 3D face model with high speed and accuracy. The resultant 3D morphable model or parameters for such a morphable model may be used in many applications such as application including visual effect applications, mapping to digital avatars, animation, adding 2D stickers or 3D dynamic props, virtual reality, photo-realistic 3D face rendering, aiding surgery through modeling, etc. The techniques discussed herein provide the capability for real-time, inexpensive, and easy to implement 3D facial capture and video modification such as facial animation, etc.

As discussed herein, embodiments include processing video frames (which may also be characterized as pictures or images) having representations of a human face. Notably, the video frames are standard format including RGB data, YUV data, or the like without depth information. The input video frames may be preprocessed by cropping (e.g., based on a detected face) and downscaling to, for example 256×256 pixels. For a first input video frame, an input vector based on the cropped and downscaled region is generated. In an embodiment, the input vector includes RGB data corresponding to the cropped and downscaled region such that the input vector as a 256×256×3 vector including an R, G, and B value for each pixel location. The input vector is provided to a pretrained convolutional neural network (CNN), which includes, as an output layer, nodes to provide an output vector including parameters for a 3D face model (i.e., a morphable model parameter vector). As used herein, the term CNN is used to indicate any neural network used to analyze visual imagery. For example, CNNs typically include feed-forward artificial neural networks. The 3D face model may include any suitable parameters for implementation by the 3D face model to generate a representation of a human face, characterized herein as a face mesh. In an embodiment, the morphable model parameter vector includes values to provide geometric shape, texture (e.g., skin albedo), illumination, and pose for the face mesh or face model of the human face.

Furthermore, for temporally subsequent video frames, an input vector (e.g., a temporal tracking input vector) based on cropped and downscaled regions of two temporally adjacent frames is generated. In an embodiment, the temporal tracking input vector includes RGB data corresponding to the cropped and downscaled regions of two temporally adjacent frames such that the temporal tracking input vector is a 256×256×3×2 vector including an R, G, and B value for each pixel location for both of the cropped and downscaled regions. The temporal tracking input vector differs from the previously discussed input vector in that it includes data for two cropped and downscaled regions. The temporal tracking input vector is provided to a second pretrained CNN, which includes, as an output layer, nodes to provide an output vector including delta parameters for a 3D face model (i.e., a morphable model parameter delta vector). The morphable model parameter delta vector provides delta or difference values for each parameter of the previously discussed morphable model parameter vector for temporally first frame of the two temporally adjacent frames. The morphable model parameter vector for the temporally first frame (as determined by the first CNN if a first frame in a sequence) is then modified by the morphable model parameter delta vector (e.g., they are added or differenced) to generate a morphable model parameter vector for the temporally second frame.

Thereby, morphable model parameter vectors are generated for each or some frames of a video sequence using, for the temporally first frame, a spatial or image pre-trained CNN and, for temporally subsequent frames, a tracking or temporal pre-trained CNN (separate from the spatial or image pre-trained CNN). The previously discussed 3D face model may implement or be modeled by the morphable model parameter vectors to generate a 3D face mesh or model representative of a human face. The input video frames may then be modified based on the 3D face mesh or model to generate output video frames, which are stored and/or presented to a user. The modification may include any suitable modification such as applying visual effects using information from the 3D face mesh or model (e.g., applying an effect at the end of the nose as indicated by the 3D face mesh or model), by modifying the 3D face mesh or model itself (e.g., applying a mask texture to regions of the 3D face mesh or model), etc. In some embodiments, output video frames are generated using the 3D face mesh or model without use of the input video frames. For example, output video frames may be generated by rendering an avatar using the 3D face mesh or model, rendering a photo-realistic image using the 3D face mesh or model, etc.

The techniques discussed herein offer automatic capture and tracking of a 3D representation of a human face from, for example, consumer RGB cameras as well as offering 2D/3D special effects based on the 3D representations in real time. Such techniques may be implemented in real-time environments to support real-time 3D face modeling, tracking, and enhancement (modification) based on images, as discussed, from RGB cameras. The discussed techniques offer high accuracy, temporal stability, and tracking for improved device performance. Furthermore, the discussed techniques are computationally efficient and provide improved device efficiency and power savings during implementation. The techniques discussed herein provide a 3D morphable face model (e.g., 3D morphable model, 3DMM) fitting method that automatically (e.g., without human intervention) determines face model parameters from input video frames.

FIG. 1 illustrates an example system 100 for capturing 3D faces and applying effects based on the captured 3D faces, arranged in accordance with at least some implementations of the present disclosure. As shown in FIG. 1, system 100 includes an image preprocessing module 121, an image CNN 122, a 3D face rendering module 124, an effects and image output module 126, a (temporal) tracking CNN 123, a 3D face rendering module 125, and an effects and image output module 127. Also as shown, image CNN 122, 3D face rendering module 124, and effects and image output module 126 may be implemented as a first stage 141 (or a spatial stage) and tracking CNN 123, 3D face rendering module 125, and effects and image output module 127 may be implemented as a second stage 142 (or a temporal tracking stage). Image CNN 122 may be characterized as a spatial CNN, picture CNN, or the like. Tracking CNN 123 may be characterized as a temporal CNN, temporal tracking CNN, or the like. As shown, image CNN 122 and tracking CNN 123 are separate CNNs having differing and separate input layers, internal layers, and output layers. System 100 may be implemented via any suitable device such as a personal computer, a laptop computer, a tablet, a phablet, a smart phone, a digital camera, a gaming console, a wearable device, a display device, an all-in-one device, a two-in-one device, or the like. For example, system 100 may provide at least a portion of an image signal processing pipeline that may be implemented in hardware, software, or a combination thereof. As discussed, system 100 may implement a 3D morphable face model 131. As shown, system 100 receives input video 101 including any number of input images including representations of a human face.

Input video 101 may include any suitable video frames, video pictures, video images, sequences of such video frames, pictures, or images, group of pictures, video data, or the like in any suitable resolution. For example, the video may be video graphics array (VGA), high definition (HD), Full-HD (e.g., 1080p), 4K resolution video, 5K resolution video, or the like, and the video may include any number of video frames, sequences of video frames, pictures, groups of pictures, or the like. For example, input video 101 may be monocular video (e.g., having one view) from a single RGB camera. Techniques discussed herein are discussed with respect to video frames, images, and pictures interchangeably. For example, a frame, picture, or image of color video data may include three chrominance planes (pixel values for chrominance) or channels such as R, G, and B planes or a luminance plane (e.g., pixel values for luminance) or channel and two chrominance planes (e.g., pixel values for chrominance) or channels. Input video 101 includes any number of frames or images 102, 103, 104 such that images 102, 103, 104 are in a temporal order. That is image 102 temporally precedes image 103 with any number of intervening images and image 103 temporally precedes image 104. In an embodiment, image 103 immediately temporally precedes image 104 (i.e., there are no intervening images). In an embodiment, input video 101 is captured in real time via a camera (not shown). In an embodiment, input video 101 is received from memory (not shown) or a remote device (not shown). Input video 101 may be characterized as a plurality of sequential video images, pictures, or frames.

As shown, image preprocessing module 121 receives input images 102, 103, 104. Input images 102, 103, 104 may include any number of representations of a human face or faces. In an embodiment, input images 102, 103, 104 includes a single representation of a single human face that is changing expression, pose, etc. over time. Image preprocessing as performed by image preprocessing module 121 may include any suitable image preprocessing to generate input vectors 112, 113, 114 corresponding to input images 102, 103, 104. For example, image preprocessing module 121 may perform face detection, face landmark detection, or the like to detect a representation of a human face in one or more of input images 102, 103, 104. Based on the detected face, image preprocessing module 121 may crop each of input images 102, 103, 104 to a region including the face and downscale the cropped region to a predefined standard size. In an embodiment, image preprocessing module 121 detects a human face, crops input images 102. 103, 104 to a predetermined region shape (e.g., square), downscales the region to a predetermined pixel density (e.g., to a resolution of 256×256 pixels), and generates each of input vectors 112, 113, 114 as a concatenation of the chrominance pixel values for each pixel location of the downscaled region. In an embodiment, each of input vectors 112, 113, 114 includes 256×256×3 values including a value for each of three (e.g., RGB) chrominance values for each of the downscaled pixel values.

Such cropping and downscaling techniques may be performed using any suitable technique or techniques such as downsampling techniques. Furthermore, although discussed with respect to cropping and downscaling RGB images to 256×256 pixels, any suitable image format and region size and shape may be used. In an embodiment, the region is a rectangular region having a greater height than width. In an embodiment, no downscaling is applied. In any event, each of input vectors 112, 113, 114 are formatted to the format(s) used to pretrain image CNN 122 and tracking CNN 123, as discussed further herein below.

Figure 2:
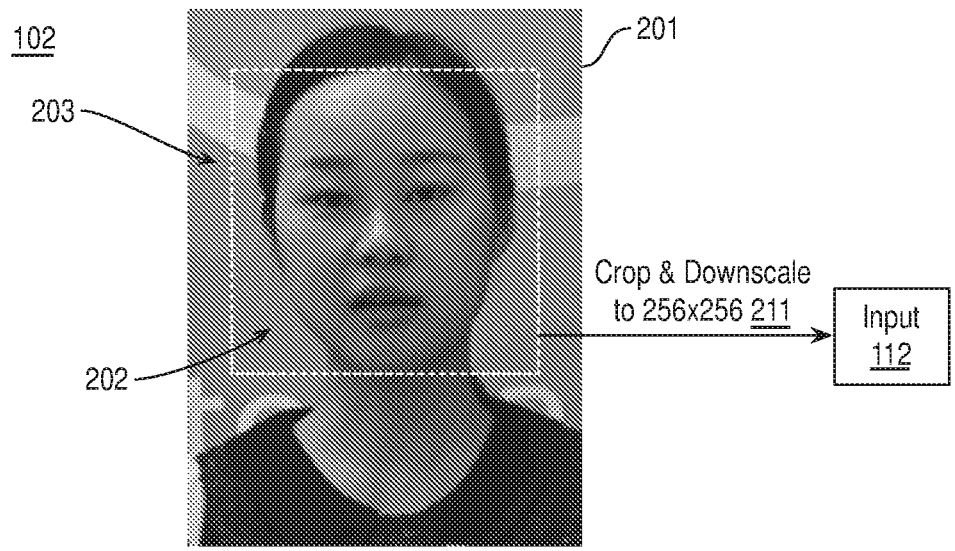
FIG. 2 illustrates processing an example input image to generate an example input vector.

FIG. 2 illustrates processing an example input image 102 to generate an example input vector 112, arranged in accordance with at least some implementations of the present disclosure. As shown in FIG. 2, input image 102 at least a portion 201 thereof (e.g., FIG. 2 may illustrate a portion 201 of a full input image 102 or an input image) having a representation of a human face 202. As discussed, representation of human face 202 may be detected and input image 102 may be cropped using a bounding box to define a sub-region 203 of input image 102. Input image 102 is cropped using sub-region 203 (e.g., keeping pixel values within sub-region 203 and discarding those outside sub-region 203) and the region within sub-region 203 is downscaled to a predetermined pixel resolution (e.g., 256×256) as shown by crop and downscale operation 211 to provide input vector 112. As discussed, input vector 112 may include a 256×256×3 element vector with the values thereof including each R, G, and B value of each pixel of the cropped and downscaled region within sub-region 203.

Returning to FIG. 1, input vector 112 is provided to image CNN 122. Notably, input vector 112 may correspond to an input image 102 that is a first image of input video 101, a first image of a sequence of input video 101, a first image after a scene change of input video 101, etc. Such an image is denoted as $I_0$. Input vector 112 is received by image CNN 122, which processes input vector 112 to generate a morphable model parameter vector 116 corresponding thereto (i.e., $\theta_0$). Herein, morphable model parameter vectors are labeled with $\theta$ and a subscript indicating the input image to which it corresponds. Image CNN 122 may include any CNN having any number of layers (e.g., 6-8 layers) including an input layer and an output layer. The input layer has the same number of nodes as the number of elements of input vector 112 and the output layer has the same number of elements as morphable model parameter vector 116, which are needed to model a 3D face model as is discussed further herein below. The layers of image CNN 122 may include any suitable processing layers such as layers followed by rectified linear units (ReLU), max pooling, and/or local response normalization (LRN) as is known in the art. Image CNN 122 is pretrained using any suitable technique or techniques such as those discussed herein below with respect to FIG. 6.

Morphable model parameter vector 116 is provided to 3D face rendering module 124, which implements 3D face model 131 using morphable model parameter vector 116 to generate a resultant face mesh or 3D face. The resultant face mesh includes any suitable data structure representative of a human face such as per vertex shape, per vertex texture (e.g., skin albedo), and illumination parameters. Notably, the resultant face mesh or 3D face may be projected onto a 2D image to generate an output image.

In an embodiment, 3D face model 131 is modeled using morphable model parameter vector 116 to generate a reconstructed 3D face with correct oppose and 3D shape as follows. 3D face model 131 (e.g., a 3D morphable model, 3DMM) parameterizes a novel face as shown with respect to Equations (1). (2), and (3) as follows:

$$S = \overline{S} + A_{id}\alpha_{id} + A_{exp}\alpha_{exp} \quad (1)$$

$$T = \overline{T} + A_{alb}\alpha_{alb} \quad (2)$$

$$I_i = T_i \cdot \Sigma_{b=1}^{B^2} h_b(n_i) * \gamma_b \quad (3)$$

where Equation (1) defines the geometric shape of the reconstructed 3D face, Equation (2) defines the skin albedo (e.g., texture or reflectance) of the reconstructed 3D face, and Equation (3) defines the appearance illumination of the reconstructed 3D face. In the above Equations, $\overline{S}$, $\overline{T} \in \mathbb{R}^{3N}$ encode the per-vertex shape (S) and albedo (T) of a predetermined average face with N being the vertex number (i.e., number of vertices). The shape of the predetermined average face is then modified by modifications (using $\alpha_{id}$) to the shape identity matrix $A_{id}$ and modifications (using $\alpha_{exp}$) to the shape identity matrix $A_{exp}$. The albedo of the predetermined average face is also modified by modifications (using $\alpha_{alb}$) to the albedo identity matrix $A_{exp}$. That is. $A_{id}$, $A_{alb} \in \mathbb{R}^{3N \times K}$ are the shape identity basis matrix and the albedo basis matrix, respectively, with, for example, K=99 and $A_{exp} \in \mathbb{R}^{3N \times K_e}$ is a delta expression matrix with, for example, $K_e$=80. The modifications to such basis matrices discussed above are characterized herein as coefficients to modify such matrices. Using the shape coefficients, expression coefficients, and albedo coefficients, the basis matrices are modified, using matrix multiplication, and added to the predetermined average face shape and albedo, respectively, to provide a shape and albedo of a unique face. Furthermore, in Equation (3), $T_i$ is the skin albedo of the $i^{th}$ vertex and $h_b(n_i) \in \mathbb{R}$ is the $b^{th}$ spherical harmonics (SH) basis function determined normal, $n_i$, with B set to 3.

Furthermore, the discussed shape, albedo, and illumination (e.g., providing a 3D face model) are projected, using a perspective camera model based on rotation, translation, and focus parameters, onto a 2D image plane. Therefore, to fully translate 3D face model 131 to a 2D image plane rendering of the detected face, morphable model parameter vector 116 includes the following parameters: $\alpha_{id} \in \mathbb{R}^{99}$, $\alpha_{alb} \in \mathbb{R}^{99}$, $\alpha_{exp} \in \mathbb{R}^{80}$ (coefficients to modify a shape identity basis matrix of 3D face model 131, coefficients to modify an expression identity basis matrix of 3D face model 131, and coefficients to modify a texture identity basis matrix of 3D face model 131, respectively), $\gamma = \{\gamma_1^r, \gamma_1^g, \gamma_1^b, \ldots, \gamma_9^r, \gamma_9^g, \gamma_9^b\}$ (illumination parameters), R, T (pose transformation parameters for rotation and translation, respectively), and f (a camera parameter for pose transformation), such that any morphable model parameter vector discussed herein may include 3 rotation parameters, 3 translation parameters, 1 camera parameter, 99 coefficients to modify a shape identity basis matrix of 3D face model 131, 99 coefficients to modify an expression identity basis matrix of 3D face model 131, 80 coefficients to modify a texture identity basis matrix of 3D face model 131, and 27 illumination parameters for a total of 312 parameters. That is, a morphable model parameter vector, $\theta$, may be characterized as follows: $\theta = \{R, T, f, ad, \alpha_{id}, \alpha_{alb}, \alpha_{exp}, \gamma\}$.

Figure 3:
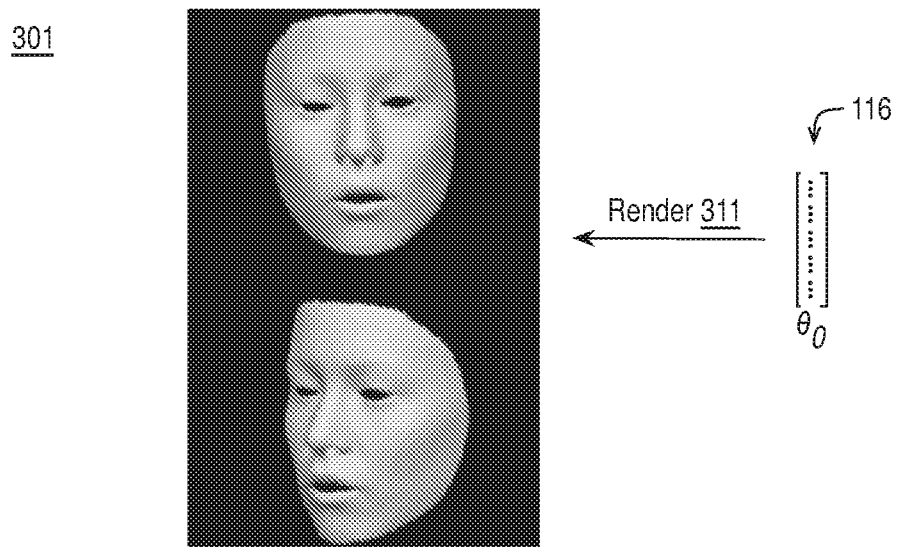
FIG. 3 illustrates processing an example morphable model parameter vector to generate an example 3D mesh or face model.

FIG. 3 illustrates processing an example morphable model parameter vector 116 to generate an example 3D mesh or face model, arranged in accordance with at least some implementations of the present disclosure. As shown in FIG. 3, morphable model parameter vector 116 is rendered via render operation 311 as discussed above to generate 3D face model 301 that corresponds to human face 202 (please see FIG. 2). In the illustrated example of FIG. 3, 3D face model 301 is shown at two perspectives—the top face on and the bottom rotated—for the sake of clarity of presentation. Render operation 311 may be applied using any suitable technique or techniques discussed herein such as application of one or more of rotation parameters, translation parameters, a camera parameter, coefficients to modify a shape identity basis matrix of 3D face model 131, coefficients to modify an expression identity basis matrix of 3D face model 131, coefficients to modify a texture identity basis matrix of 3D face model 131, and illumination parameters for a total of 312 parameters. Notably, not all of the parameters or elements of morphable model parameter vector 116 need to be applied to render 3D face model 301. For example, texture may be applied to all or portions 3D face model 301 as a special effect.

Returning to FIG. 1, 3D face rendering module 124, then, receives 3D face model 131 and implements at least a portion of morphable model parameter vector 116 via the model (e.g., a representative face model is generated using morphable model parameter vector 116) to generate a face mesh or 3D face model. Optionally, one or more special effects may be applied based on the face mesh or 3D face model via effects and image output module 126. The special effects may be applied using any suitable technique or techniques. In an embodiment, application of a special effect includes adding an image element (e.g., an animated sprite, an cropped image, etc.) based on a particular location of the 3D face model such as at a vertex of the nose, covering an eye, on a cheek, etc. and applying the image element to input image 102 to generate an output image 118 including the image element. Notably, the 3D face model enables accurate application of such image elements.

Figure 4:
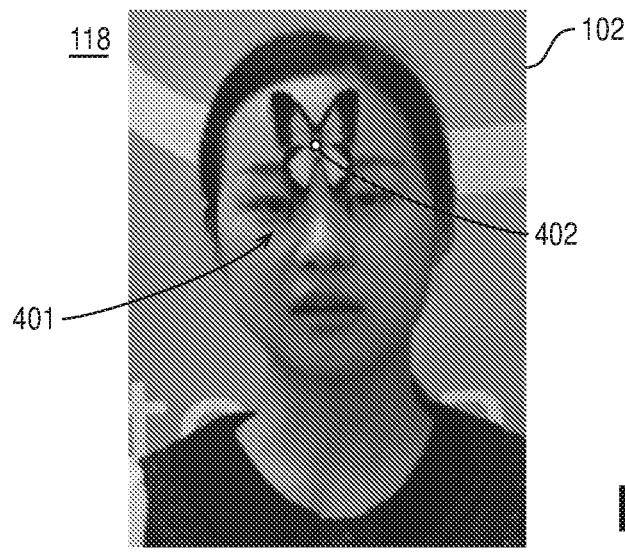
FIG. 4 illustrates applying an example 3D object element using a 3D face model.

FIG. 4 illustrates applying an example 3D object element 401 using 3D face model 301, arranged in accordance with at least some implementations of the present disclosure. As shown in FIG. 4, 3D object element 401 (i.e., the rendering result of a 3D flying butterfly) is applied to input image 102 using 3D face model 301. In particular, 3D object element 401 is applied to a particular location 402 of input image 102 based on 3D face model 301. In an embodiment, 3D object element 401 is to be applied to a desired location on human face 202 and, correspondingly, 3D face model 301 (e.g., on the forehead, on the tip of the nose, etc.) and the location is determined within input image 102 using morphable model parameter vector 116 as applied to 3D face model 131 to generate 3D face model 301. In an embodiment, 3D object element 401 is rendered with 3D face model and the resultant rendering is projected to a 2D image plane. In an embodiment, 3D face model 301 is projected onto the 2D image plane of input image 102 and a pixel location 402 corresponding to a particular vertex of 3D face model 301 is used to center or provide a lower left corner or the like of 3D object element 401. 3D object element 401 may then be overlaid onto input image 102 to generate output image 118 including 3D object element 401 as shown.

With reference to FIG. 1, in other embodiments, a special effect texture is applied to a portion or all of the 3D face model, the portion of the 3D face model is translated onto the 2D image plane of input image 102, and the translated portion is overlaid onto input image 102 to generate output image 118. In an embodiment, effects and image output module 126 receives the 3D face model as generated by morphable model parameter vector 116 and applies a texture to a region (e.g., over the eyes in effecting a mask, on the cheeks or eyelids in effecting make-up, on a check in effecting a scar, etc.) or an entirety of the 3D face model. The texture effect may be applied using any suitable technique or techniques such as texture mapping techniques and/or 3D graphics rendering techniques.

Figure 5:
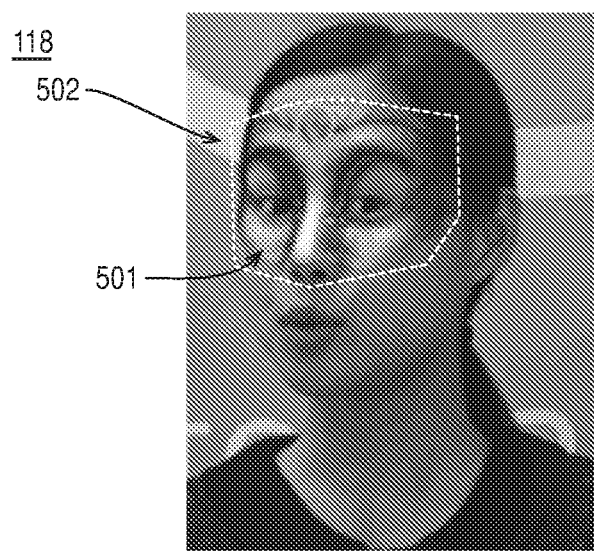
FIG. 5 illustrates applying an example texture element using a 3D face model.

FIG. 5 illustrates applying an example texture element 501 using 3D face model 301, arranged in accordance with at least some implementations of the present disclosure. As shown in FIG. 5, texture element 501 (i.e., a decorative mask texture) is applied to input image 102 using 3D face model 301. In particular, texture element 501 is applied to a particular region 502 of input image 102 based on 3D face model 301. In an embodiment, texture element 501 is to be applied to a desired region on human face 202 and, correspondingly, 3D face model 301 (e.g., on the forehead, on a portion to mimic a mask, on cheeks, over eyes, etc.) and the location is determined within input image 102 using morphable model parameter vector 116 as applied to 3D face model 131 to generate 3D face model 301. In an embodiment, the desired texture is applied to 3D face model 301 and the resultant textured region is projected onto the 2D image plane of input image 102. Thereafter, the resultant textured projection is overlaid onto input image 102 to generate output image 118 including texture element 501 as shown.

Returning to FIG. 1, effects and image output module 126 may generate output image 118 based on the rendered 3D face model using any suitable technique or techniques. In an embodiment, the 3D face model is generated to be photorealistic (e.g., as close of a match to human face 202 as possible), the 3D face model is translated to an image plane and inserted into a predetermined background image (e.g., the human face is placed onto an otherwise animated or previously image captured character or avatar or into a previously image captured environment or a virtual reality (VR) setting or the like) to generate output image 118. In an embodiment, the 3D face model is textured (e.g., colored to match a character), the 3D face model is translated to the image plane of input image 102 or another image plane and inserted into input image 102 or a predetermined background image to generate output image 118. In an embodiment, the 3D face model is modified or adjusted to match a desired surgical output (e.g., for beauty or injury repair) and the adjusted 3D face model is translated to an output image plane to generate output image 118 for reference by a surgeon during operation. For example, the discussed techniques may be used in a wide variety of contexts such as the creation of special visual effects in films, television and games, mapping the captured (and optionally modified) face to a digital avatar, adding 2D stickers or 3D dynamic props to a face in videos (e.g., substitute for the host face with some virtual elements optionally in real-time, application in VR social networking, and aiding a doctor in performing surgery using the reconstructed 3D face model.

As discussed, image preprocessing module 121 generate input vectors 112, 113, 114 corresponding to input images 102, 103, 104. As shown, input vectors 113, 114 corresponding to input images 102, 103, 104, respectively, are combined to form an input vector 115. For example, input vectors 113, 114 may include values including a value for each of three (e.g., RGB) chrominance values for each of the downscaled pixel values of cropped and downscaled regions as discussed herein. Input vector 115 includes a combination of such values. In an embodiment, input vector includes a concatenation of input vectors 113, 114. In an embodiment, input vector includes 256×256×3×2 values corresponding to a value for each of three (e.g., RGB) chrominance values for each of the downscaled pixel values (e.g., at a resolution of 256×256 pixels) for both the cropped region of input image 103 and the cropped region of input image 104. Although discussed with respect to RGB values for a square 256×256 pixel cropped region, any suitable pixel values (e.g., YUV values) and shape and size of cropped regions may be used. Notably, input vector 115 is formatted to the format used to pretrain tracking CNN 123.

As discussed, input vector 115 corresponds to input images 103, 104 (labeled $I_{t-1}$ and $I_t$, respectively). As discussed, input image 104 is temporally subsequent to input image 103. In an embodiment, input image 104 is immediately temporally subsequent to input image 103 such that no intervening frames are between input images 103, 104. In an embodiment, input image 103 is image $I_0$ and input image 104 is a temporally subsequent input image (e.g., $I_1$). The processing discussed with respect to input images 103, 104 may be performed for any number of temporally adjacent input images.

Input vector 115 is provided to tracking CNN 123, which processes input vector 115 to generate a morphable model parameter delta vector 117 corresponding thereto (i.e., $\Delta\theta_t$). Herein, morphable model parameter delta vectors are labeled with $\Delta\theta$ and a subscript indicating the input image to which the morphable model parameter delta vector corresponds. Tracking CNN 123 may include any CNN having any number of layers (e.g., 6-8 layers) including an input layer and an output layer. The input layer has the same number of nodes as the number of elements of input vector 115 and the output layer has the same number of elements as morphable model parameter vector 116 and morphable model parameter delta vector 117, as needed to model 3D face model 131. The layers of tracking CNN 123 may include any suitable processing layers such as layers followed by rectified linear units (ReLU), max pooling, and/or local response normalization (LRN) as is known in the art. Tracking CNN 123 is pretrained using any suitable technique or techniques such as those discussed herein below with respect to FIG. 7.

As used herein, the term morphable model parameter delta vector indicates a vector of elements or values to adjust or modify a morphable model parameter vector. A morphable model parameter delta vector includes delta values for each of the values or elements of a morphable model parameter vector as discussed above. In an embodiment, morphable model parameter delta vector 117 includes delta coefficient values to adjust coefficients to modify a shape identity basis matrix of 3D face model 131, delta coefficient values to adjust coefficients to modify an expression identity basis matrix of 3D face model 131, delta coefficient values to adjust coefficients to modify a texture identity basis matrix of 3D face model 131, delta values or parameters to adjust illumination parameters, delta pose transformation parameters to modify rotation and translation values, respectively, and a delta camera parameter to adjust a camera parameter for pose transformation. That is, a morphable model parameter delta vector, $\Delta\theta$, may be characterized as follows: $\Delta\theta = \{\Delta R, \Delta T, \Delta f, \Delta\alpha_{id}, \Delta\alpha_{alb}, \Delta\alpha_{exp}, \Delta\gamma\}$.

For example, morphable model parameter delta vector 117 may include 312 delta parameters corresponding to the 312 parameters discussed with respect to a morphable model parameter vector. Such modification or adjustment values of morphable model parameter delta vector 117 may be added to or subtracted from a morphable model parameter vector such as morphable model parameter vector 132 to generate a morphable model parameter vector ($\theta_t$, not shown). That is, morphable model parameter delta vector 117, corresponding to input vector 115, which in turn corresponds to temporally adjacent input images 103, 104 ($I_{t-1}$, $I_t$), is added to or subtracted from morphable model parameter vector 116 ($\theta_{t-1}$), which corresponds to input image 103 ($I_{t-1}$) to generate a morphable model parameter vector ($\theta_t$, not shown) for input image 104 ($I_t$). Thereby, temporal updates to morphable model parameter vectors are provided across frames using the output of tracking CNN 123.

As shown, 3D face rendering module 125 receives morphable model parameter delta vector 117, morphable model parameter vector 132 (which may be generated by image CNN 122 or a previous combination of a morphable model parameter vector and a morphable model parameter delta vector), and 3D face model 131. 3D face rendering module 125 generates a morphable model parameter vector for the current input image (e.g., $I_t$) by modifying morphable model parameter vector 132 using morphable model parameter delta vector 117. Such modification may be by addition, subtraction, or multiplication of morphable model parameter vector 132 by morphable model parameter delta vector 117. 3D face rendering module 125 then implements at least a portion of the morphable model parameter vector for the current image based on 3D face model 131 (e.g., a representative 3D face model is generated using the morphable model parameter vector, $\theta_t$) to generate a face mesh or 3D face model. Optionally, one or more special effects may be applied based on the face mesh or 3D face model via effects and image output module 127.

3D face rendering module 125 may generate the face mesh or 3D face model using any techniques discussed herein with respect to 3D face rendering module 124. Furthermore, effects and image output module 127 may implement special effects and generate output image 119 corresponding to input image 104 using any techniques discussed herein with respect to effects and image output module 126. Such description is not repeated for the sake of brevity and clarity of presentation. Notably, 3D face rendering module 125 and 3D face rendering module 124 and/or effects and image output module 126 and effects and image output module 127 may be implemented separately, as illustrated, or they may be implemented together. In an embodiment, separate implementation via first stage 141 and second stage 142 may offer the advantage of parallel processing. For example, one or more processes of first stage 141 and second stage 142 may be implemented simultaneously.

Figure 6:
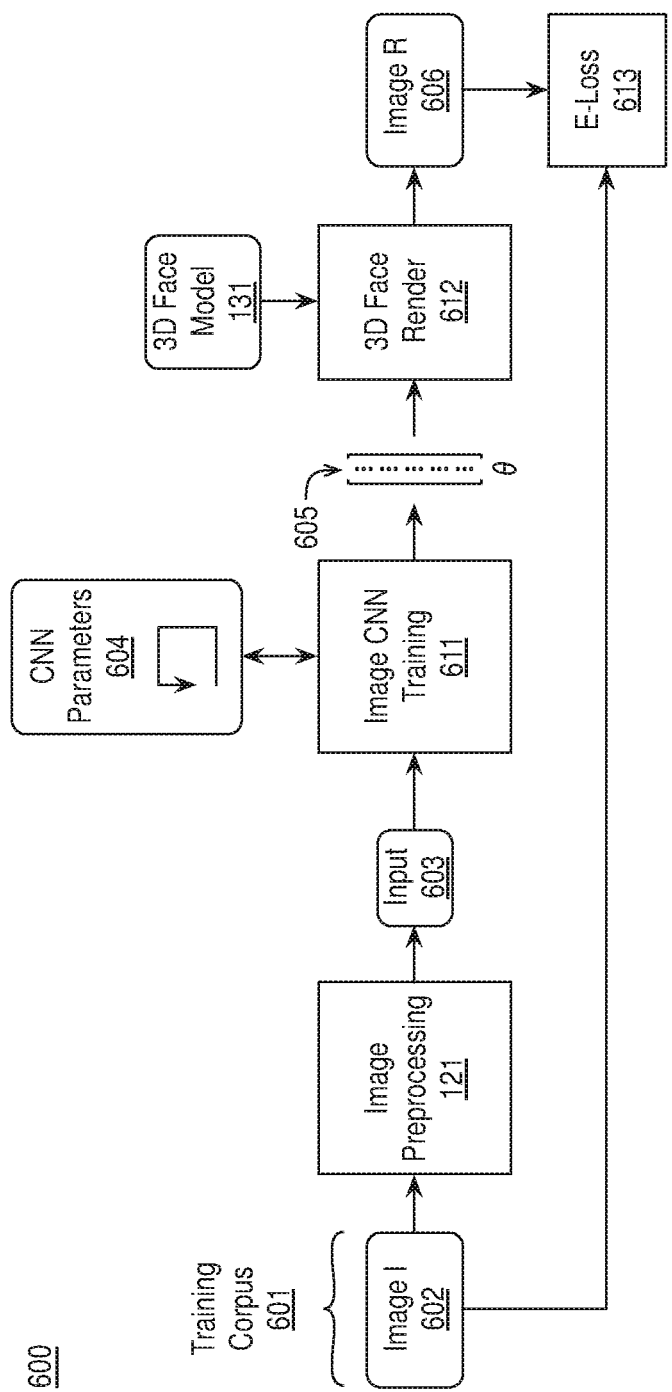
FIG. 6 illustrates an example system for pretraining an image CNN.

FIG. 6 illustrates an example system 600 for pretraining an image CNN, arranged in accordance with at least some implementations of the present disclosure. As shown in FIG. 6, system 600 includes image preprocessing module 121, an image CNN training module 611, 3D face rendering module 612, and a loss measurement module 613. System 600 may be implemented via any suitable device discussed with respect to system 100. As shown, system 600 receives a training corpus 601 of any number of input images (only one of which is illustrated for the sake of clarity) including representations of a human face.

As discussed herein, image preprocessing module 121 receives input images 602 and generates corresponding input vectors 603 corresponding thereto. Training corpus 601 may include any number of input images 602 such as about 100,000 images each including a representation of a human face. In an embodiment, pre-training the image CNN is self-supervised training such that input images 602 of training corpus 601 are unlabeled images. Input images 602 and input vectors 603 may have any characteristics discussed herein with respect to input images 102, 103, 104 and input vectors 112, 113, 114. For example, image preprocessing module 121 may perform face detection, face landmark detection, or the like to detect a representation of a human face, crop input image 602 to a region including the face, downscale the cropped region to a predefined standard pixel resolution, and generates each of input vector 603 as a concatenation of the chrominance pixel values for each pixel location of the downscaled region. In an embodiment, each of the input vectors includes 256×256×3 values including a value for each of three (e.g., RGB) chrominance values for each of the downscaled pixel values.

Input vectors 603 are iteratively provided, over a large number of training iterations, to image CNN training module 611. During training. CNN parameters 604 are trained (e.g., updated after each image or after processing groups of images) based on input vectors 603 and using a cost function to compare the representation of a human face in an input image 602 and a reconstructed 3D human face model generated based on the output of the current image CNN as provided by image CNN training module 611 using current CNN parameters 604.

For example, at a current iteration and for a current input vector 603, image CNN training module 611 implements a current image CNN using current CNN parameters 604 to generate a morphable model parameter vector 605 corresponding thereto. The image CNN may have any characteristics discussed herein with respect to image CNN 122. Furthermore, morphable model parameter vector 605 may have any characteristics discussed with respect to morphable model parameter vector 116 or any morphable model parameter vector discussed herein. Morphable model parameter vector 605 is provided to 3D face rendering module 612, which implements 3D face model 131 using morphable model parameter vector 605 to generate a resultant face mesh or 3D face in rendered output image 606 (illustrated as R herein). The resultant face mesh or 3D face includes any suitable data structure discussed herein. Notably, the resultant face mesh or 3D face may include or implement all details of morphable model parameter vector 605 in an attempt to match, as closely as possible, the representation of a human face included in the corresponding input image 602. Furthermore, the resultant face mesh or 3D face is projected onto a 2D image to generate rendered output image 606 to provide a realistic synthetic image including a representation of a human face.

As shown, rendered output image 606 and the corresponding input image 602 are provided to loss measurement module 613, which compares rendered output image 606 and the corresponding input image 602 via a cost or loss function that is minimized over the training of the image CNN by image CNN training module 611 (e.g., by adjusting CNN parameters 604). The cost or loss function may be any suitable function that provides a cost or loss related to the difference between rendered output image 606 and the corresponding input image 602 and/or other metrics such as a measure to constrain the morphable model parameter vectors. In an embodiment, the cost or loss function is a sum of a measure of photometric alignment between input image 602 and rendered output image 606 and a measure to constrain morphable model parameter vector 605. In an embodiment, the measure of photometric alignment is a sum of per-pixel color differences (e.g., sum of squares, sum absolute value difference, etc.). In an embodiment, the measure to constrain morphable model parameter vector 605 is a function that provides a scalar value corresponding to how much morphable model parameter vector 605 varies from a mean or median value or from a mean range or median range of values. In an embodiment, the cost or loss function is provided as shown in Equation (4):

$$E_{Loss}(\theta) = \Delta_p E_{photo}(\theta) + \Delta_r E_{reg}(\theta) \quad (4)$$

where $E_{Loss}(\theta)$ is the cost or loss function and provides a cost as a function of the current morphable model parameter vector 605 based on rendered output image 606 and the corresponding input image 602 and the measure of constraint of morphable model parameter vector 605. $E_{photo}(\theta)$ is a dense photometric alignment measurement (e.g., a sum of per pixel color difference) between rendered output image 606 and the corresponding input image 602 and is expressed as a scalar value, $E_{reg}(\theta)$ is a constraint function to measure the variation of morphable model parameter vector 605 from a mean or median and/or to measure violation of constraints of expected parameter values of morphable model parameter vector 605 expressed as a scalar value, $\Delta_p$ is a weighting coefficient for the dense photometric alignment measurement, and $\Delta_r$ is a weighting coefficient for the constraint function measurement.

After evaluation by loss measurement module 613, CNN parameters 604 are adjusted (e.g., on a per image, per group of image, or per training corpus basis) and such processing is repeated until the cost or loss function applied by loss measurement module 613 is minimized. As discussed, in some embodiments, such CNN training is self-supervised such that input images 602 of training corpus 601 are unlabeled images. Furthermore, such CNN training is end-to-end training such that input vectors 603 and output morphable model parameter vectors 605 are evaluated directly without division of the image CNN during training. Also, since the rendering layer (e.g., as implemented by 3D face rendering module 612) and the loss function (e.g., as implemented by loss measurement module 613) are fully analytical and differentiable, back-forward pass training may be implemented using back propagation techniques as is known in the art.

Figure 7:
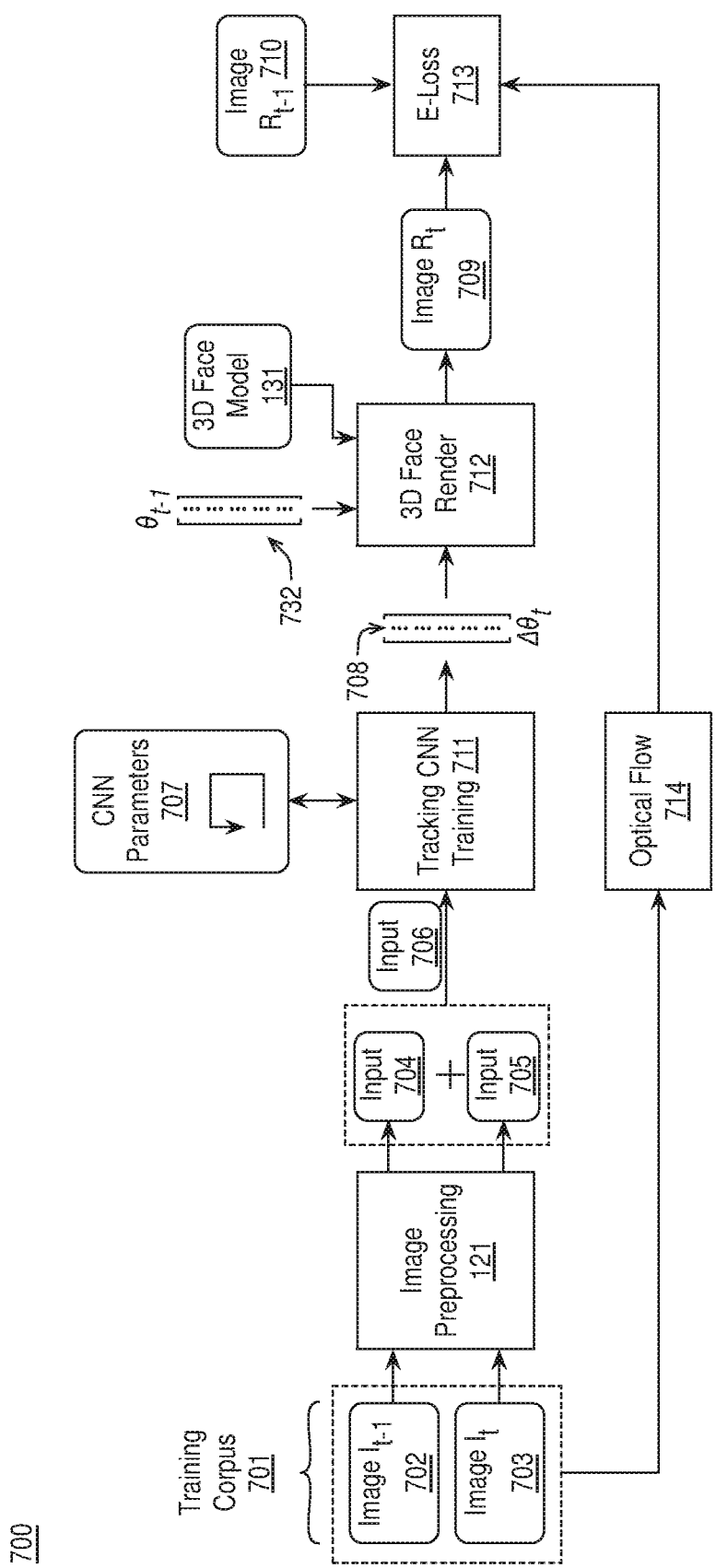
FIG. 7 illustrates an example system for pretraining a tracking CNN.

FIG. 7 illustrates an example system 700 for pretraining a tracking CNN, arranged in accordance with at least some implementations of the present disclosure. As shown in FIG. 7, system 700 includes image preprocessing module 121, a tracking CNN training module 711, 3D face rendering module 712, a loss measurement module 713, and an optical flow module 714. System 700 may be implemented via any suitable device discussed with respect to system 100. As shown, system 700 receives a training corpus 701 of any number of temporally sequential input images or video frames (only two of which are illustrated for the sake of clarity) each including a representation of a human face.

As discussed herein, image preprocessing module 121 receives input images 702, 703 and generates corresponding input vectors 704, 705 corresponding thereto. Training corpus 701 may include any number of sequential input images or frames such as about 1,000 sequences of images or frames each having about 200 sequential images or frames. In an embodiment, pre-training the tracking CNN is self-supervised training such that the input images of training corpus 601 are unlabeled images. Input images 702, 703 and input vectors 704, 705 as well as input vector 706 (e.g., a combination of input vectors 704, 705) may have any characteristics discussed herein with respect to input images 102, 103, 104 and input vectors 112, 113, 114, 115. For example, image preprocessing module 121 may perform face detection, face landmark detection, or the like to detect a representation of a human face, crop input images 702, 703 to regions including the face, downscale the cropped region to a predefined standard pixel resolution, and generate each of input vectors 702, 703 as a concatenation of the chrominance pixel values for each pixel location of the downscaled region. In an embodiment, each of the input vectors includes 256×256×3 values including a value for each of three (e.g., RGB) chrominance values for each of the downscaled pixel values. Furthermore, image preprocessing module 121 or another module generates input vector 706 by concatenating input vectors 704, 705.

For example, for each temporally sequential pair of input images 702, 703, an input vector 706 is generated such that input vector 706 includes pixel values for each of the regions of input images 702, 703 including a representation of a human face. Input vectors 706 are iteratively provided, over a large number of training iterations, to tracking CNN training module 711. During training. CNN parameters 707 are trained (e.g., updated after each image or after processing groups of images) based on input vectors 706 and using a cost function to compare the representation of a human face in an input image 703 and a reconstructed 3D human face model generated based on the output of the current tracking CNN as provided by tracking CNN training module 711 using current CNN parameters 707.

For example, at a current iteration and for a current input vector 706, tracking CNN training module 711 implements a current tracking CNN using current CNN parameters 707 to generate a morphable model parameter delta vector 708 corresponding thereto. The tracking CNN may have any characteristics discussed herein with respect to tracking CNN 123. Furthermore, morphable model parameter delta vector 708 may have any characteristics discussed with respect to morphable model parameter delta vector 117 or any morphable model parameter delta vector discussed herein. Morphable model parameter delta vector 708 is provided to 3D face rendering module 712, which generates a morphable model parameter vector ($\theta_t$, not shown) by adding or subtracting morphable model parameter delta vector 117 with morphable model parameter vector 732 ($\theta_{t-1}$), which corresponds to input image 702. Morphable model parameter vector 732 may be generated using any suitable technique or techniques. In an embodiment, a morphable model parameter vector 732 is generated for each input image using pretrained image CNN 122 (e.g., pretrained as discussed with respect to FIG. 6) for use by 3D face rendering module 712. 3D face rendering module 712 then implements 3D face model 131 using the morphable model parameter vector ($\theta_t$) for the current input image 703 and input vector 706 to generate a resultant face mesh or 3D face in rendered output image 709 (illustrated as $R_t$). The resultant face mesh or 3D face includes any suitable data structure discussed herein. Notably, the resultant face mesh or 3D face may include or implement all details of the morphable model parameter vector in an attempt to match, as closely as possible, the representation of a human face included in the corresponding input image 703. Furthermore, the resultant face mesh or 3D face is projected onto a 2D image to generate rendered output image 709 to provide a realistic synthetic image including a representation of a human face.

As shown, rendered output image 709 and the corresponding input image 602 are provided to loss measurement module 613, which compares rendered output image 709 to the corresponding input image 703 and to a rendered image 710 corresponding to morphable model parameter vector 732 (with pixel matching between rendered output image and rendered image 710 established using optical flow module 714) via a cost or loss function that is minimized over the training of the tracking CNN by tracking CNN training module 711 (e.g., by adjusting CNN parameters 707). The cost or loss function may be any suitable function that provides a cost or loss related to the difference between rendered output image 709 and the corresponding input image 703 and/or a cost or loss related to the difference between rendered output image 709 and rendered image 710. As discussed, rendered image 710 is based on morphable model parameter vector 732. In an embodiment, rendered image 710 is generated by using morphable model parameter vector 732 to implement 3D face model 131 as discussed herein. In an embodiment, morphable model parameter vector 732 by applying image CNN 122 to input image 702.

For comparison of rendered output image 709 and rendered image 710, pixel matching may be established using optical flow data from optical flow module 714. Such optical flow data may be in any suitable format such as per pixel motion provided by per pixel displacement and direction data. As shown, optical flow module 714 may evaluate sub-regions including a representation of a human face to generate such optical flow data between input images 702, 703 as is known in the art. The resultant optical flow data are used to establish pixel matches between rendered output image 709 and rendered image 710 (e.g., by finding a matching pixel for a pixel of rendered image 710 in rendered output image 709 based on the per pixel displacement and direction data).

As discussed, the cost or loss function evaluated by loss measurement module 713 may be any suitable function that provides a cost or loss related to the difference between rendered output image 709 and the corresponding input image 703 and/or a cost or loss related to the difference between rendered output image 709 and rendered image 710. In an embodiment, the cost or loss function is a sum of a measure of photometric alignment between rendered output image 709 and corresponding input image 703 and a measure of temporal matching between rendered output image 709 and rendered image 710 (as pixel matched using optical flow data). In an embodiment, the measure of photometric alignment is a sum of per-pixel color differences (e.g., sum of squares, sum absolute value difference, etc.). Similarly, in an embodiment, the measure of temporal matching is a sum of per-pixel color differences (e.g., sum of squares, sum absolute value difference, etc.), which may both be provided as scalar values. In an embodiment, the cost or loss function is provided as shown in Equation (5):

$$E_{Loss}(\theta) = \lambda_s E_{spatial}(\theta) + \lambda_t E_{temporal}(\theta) \quad (5)$$

where $E_{Loss}(\theta)$ is the cost or loss function and provides a cost as a function of the current morphable model parameter vector $(\theta_t)$ and morphable model parameter vector $(\Delta\theta_t)$ based on rendered output image 709, input image 703, and rendered image 710. $E_{spatial}(\theta)$ is a dense photometric alignment measurement (e.g., a sum of per pixel color difference) between rendered output image 709 and the corresponding input image 703 and is expressed as a scalar value (e.g., it is analogous to $E_{photo}(\theta)$ and provides a measure of how well the rendered image matches the observed face image), and $E_{temporal}(\theta)$ is a measure of temporal matching between rendered output image 709 and rendered image 710 (e.g., to limit large changes between the current frame and the previous frame). As discussed, in an embodiment, $E_{temporal}(\theta)$ is a per-pixel color difference between rendered output image 709 and rendered image 710. In an embodiment, $E_{temporal}(\theta)$ is determined as shown in Equation (6):

$$E_{temporal}(\theta) = \sum_{i \in \Omega} \|R_t[i] - R_{t-1}[i]\|_2 \quad (6)$$

where $R_t$ is rendered output image 709, $R_{t-1}$ is rendered image 710, and $\Omega$ is the number of pixels in each image or image portion, and i is a counter variable. As discussed, pixel correspondence between rendered output image 709 and rendered image 710 is determined by the optical flow between input images 702, 703 (e.g., an input image pair). As discussed $E_{temporal}(\theta)$ ensures temporal tracking in video tracking results by measuring temporal coherence between input images 702, 703.

Figure 8:
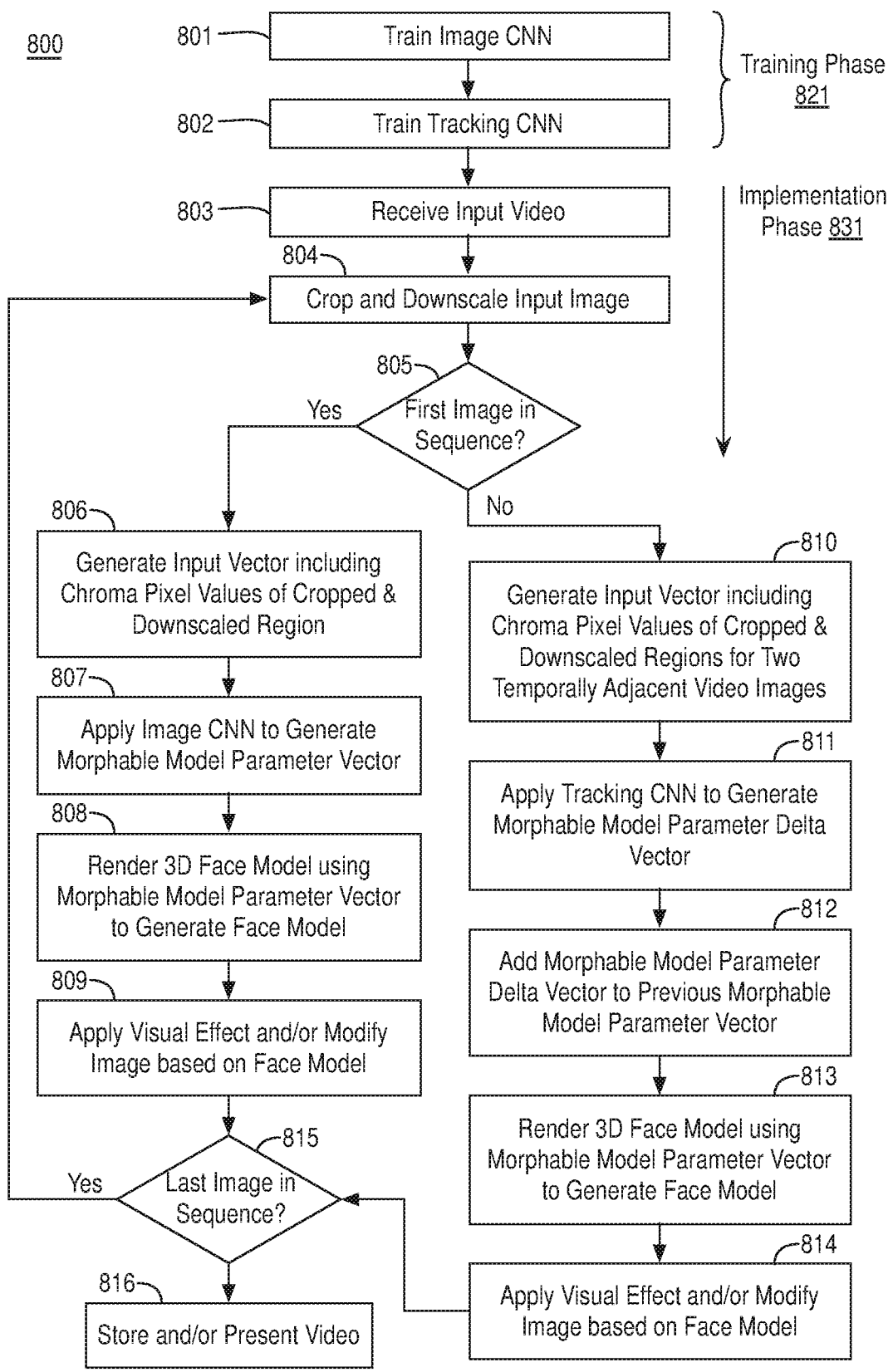
FIG. 8 is a flow diagram illustrating an example process for training CNNs and implementing them for 3D facial capture and rendering.

FIG. 8 is a flow diagram illustrating an example process 800 for training CNNs and implementing them for 3D facial capture and rendering, arranged in accordance with at least some implementations of the present disclosure. Process 800 may include one or more operations 801-816 as illustrated in FIG. 8. Process 800 or portions thereof may be performed by any device or system discussed herein Process 800 begins at operation 801, where an image CNN is trained. The image CNN may be trained using any suitable technique or techniques. In an embodiment, a predefined CNN such as a feed forward artificial neural network is modified to include a number of input nodes equal to a number of elements in an input vector representative of an image having a representation of a human face (e.g., a number of elements equal to a value for each color of each pixel position of a cropped and downscaled region) and a number of output nodes equal to a number of parameters in a morphable model parameter vector θ. The image CNN is trained to determine parameters of the image CNN (e.g., weights, coefficients, etc.). In an embodiment, the training includes iteratively providing input vectors to the image CNN and modifying the parameters thereof based on a loss or cost function associated with results from the image CNN. For example, the resultant morphable model parameter vector is used to generate a 3D face mesh or model, which is translated to a 2D image plane. The resultant image is compared to the input image to determine a spatial cost or difference. The spatial cost or difference is added to a cost associated with any deviation of the resultant morphable model parameter vector from constraints applied thereto to determine a total cost. Throughout training, the cost or loss function is minimized across training images and the resultant image CNN parameters are stored for implementation at operation 806.

Processing continues at operation 802, where a tracking CNN is trained. The tracking CNN may be trained using any suitable technique or techniques. In an embodiment, a predefined CNN such as a feed forward artificial neural network is modified to include a number of input nodes equal to a number of elements in an input vector representative of a temporally sequential image pair each having representations of a human face (e.g., a number of elements equal to a value for each color of each pixel position of cropped and downscaled regions of temporally adjacent images) and a number of output nodes equal to a number of parameters in a morphable model parameter delta vector Δθ. The tracking CNN is trained to determine parameters of the tracking CNN (e.g., weights, coefficients, etc.). In an embodiment, the training includes iteratively providing input vectors to the image CNN and modifying the parameters thereof based on a loss or cost function associated with results from the image CNN. For example, the resultant morphable model parameter delta vector is used to generate a 3D face mesh or model (after first modifying a previous image morphable model parameter vector using the morphable model parameter delta vector), which is translated to a 2D image plane. The resultant image is compared to the input image to determine a spatial cost or difference. The spatial cost or difference is added to a temporal cost determined by comparing the resultant image to a previously rendered image (with pixel matching based on an optical flow analysis of the input image pair). Throughout training, the cost or loss function is minimized across training images and the resultant tracking CNN parameters are stored for implementation at operation 811.

As shown, operations 802, 803 are performed in a training phase 821, while subsequent operations of process 800 are performed in an implementation phase 831. Notably, training phase 821 and implementation phase 831 may be performed by different devices.

Processing continues at operation 803, where input video is received using any suitable technique or techniques. In an embodiment, the input video is captured at a local device, preprocessed, and provided as a sequence of RGB or YUV images, pictures, or frames. In an embodiment, the input video is received from local memory or a remote device. Processing continues at operation 804, where an image is selected and cropped and downscaled as needed. In an embodiment, a face is detected within the selected image and cropping is performed around the detected face using a predefined shape (e.g., a square, rectangle, etc.). In an embodiment, after cropping the cropped region is downscaled to a predefined pixel resolution (e.g., N×M pixels).

Processing continues at decision operation 805, where a determination is made as to whether the image selected at operation 804 is a first frame in a video sequence. Such a determination may be made using any suitable technique or techniques such as a scene change detection or a determination that the image is a first available image or the like. If so, processing continues at operation 806, where an input vector is generated for the current image as chroma pixel values or luma and chroma values for the cropped and downscaled region (e.g., N×M×3 values for 3 chroma channels or 1 luma channel and 2 chroma channels). The pixel values may be organized within the vector using any suitable technique or techniques such as raster scan ordering or the like.

Processing continues at operation 807, where an image CNN is applied to the input vector to generate a morphable model parameter vector (θ). In an embodiment, the image CNN trained at operation 801 is applied to the input vector to generate a morphable model parameter vector. The image CNN may be any image CNN discussed herein. Furthermore, the morphable model parameter vector includes coefficients and parameters to render a 3D face mesh or face model based on a 3D face model such as a 3DMM of a face.

Processing continues at operation 808, where a 3D face model is rendered based on the morphable model parameter vector, and at operation 809, where a visual effect is applied or an image is modified based on the face mesh or model to generate an output image. In an embodiment, a portion of the parameters of the morphable model parameter vector are used to render the 3D face mesh or model, which is subsequently modified (e.g., by application of a color or texture to the face) to generate a 2D image. In an embodiment, a portion or all of the parameters of the morphable model parameter vector are used to render the 3D face mesh or model, which is translated to a 2D image and used to generate either a modified version of the current input image as an output image or an entirely new output image. For example, the 2D image of the face may be inserted into the input image or applied to another image (e.g., having a particular backdrop or animation) to generate an output image. In an embodiment, the 3D face mesh or model is used to render an image such that the 3D face mesh or model is inserted into a 3D model prior to translation to a 2D image. In an embodiment, a photo-realistic version of the 3D face mesh or model is inserted into an image background.

Returning to decision operation 805, if the current image is not a first image in a sequence, processing continues at operation 810, where an input vector is generated for an input image pair including the current image and a temporally previous image as chroma pixel values or luma and chroma values for the cropped and downscaled regions of the current image and the temporally previous image (e.g., N×M×3×2 values for 3 chroma channels or 1 luma channel and 2 chroma channels for two images). The pixel values may be organized within the vector using any suitable technique or techniques such as a raster scan ordering of the region for the temporally previous image followed by a raster scan ordering of the region for the current image or the like.

Processing continues at operation 811, where a tracking CNN is applied to the input vector to generate a morphable model parameter delta vector (Δθ). In an embodiment, the tracking CNN trained at operation 802 is applied to the input vector to generate a morphable model parameter delta vector. The tracking CNN may be any tracking CNN discussed herein. Furthermore, the morphable model parameter delta vector includes adjustments to coefficients and parameters (e.g., deltas for such values) to render a 3D face mesh or face model based on a 3D face model such as a 3DMM of a face.

Processing continues at operation 812, where the morphable model parameter delta vector generated at operation 811 is added to (or subtracted from) a previous morphable model parameter vector for the temporally previous image of the pair of images to determine the morphable model parameter vector for the current frame. Processing continues at operation 813, where a 3D face model is rendered based on the morphable model parameter vector, and at operation 814, where a visual effect is applied or an image is modified based on the face mesh or model to generate an output image. In an embodiment, a portion of the parameters of the morphable model parameter vector are used to render the 3D face mesh or model, which is subsequently modified (e.g., by application of a color or texture to the face) to generate a 2D image. In an embodiment, a portion or all of the parameters of the morphable model parameter vector are used to render the 3D face mesh or model, which is translated to a 2D image and used to generate either a modified version of the current input image as an output image or an entirely new output image. For example, the 2D image of the face may be inserted into the input image or applied to another image (e.g., having a particular backdrop or animation) to generate an output image. In an embodiment, the 3D face mesh or model is used to render an image such that the 3D face mesh or model is inserted into a 3D model prior to translation to a 2D image. In an embodiment, a photo-realistic version of the 3D face mesh or model is inserted into an image background.

Processing continues from operation 809 or operation 814 at decision operation 815, where a determination is made as to whether the current image is a last image in the sequence. If not, processing continues at operation 804 as discussed above. If so, processing continues at operation 816, where the generated output images are stored as a video sequence and/or presented as video to a user via a display.

Figure 9:
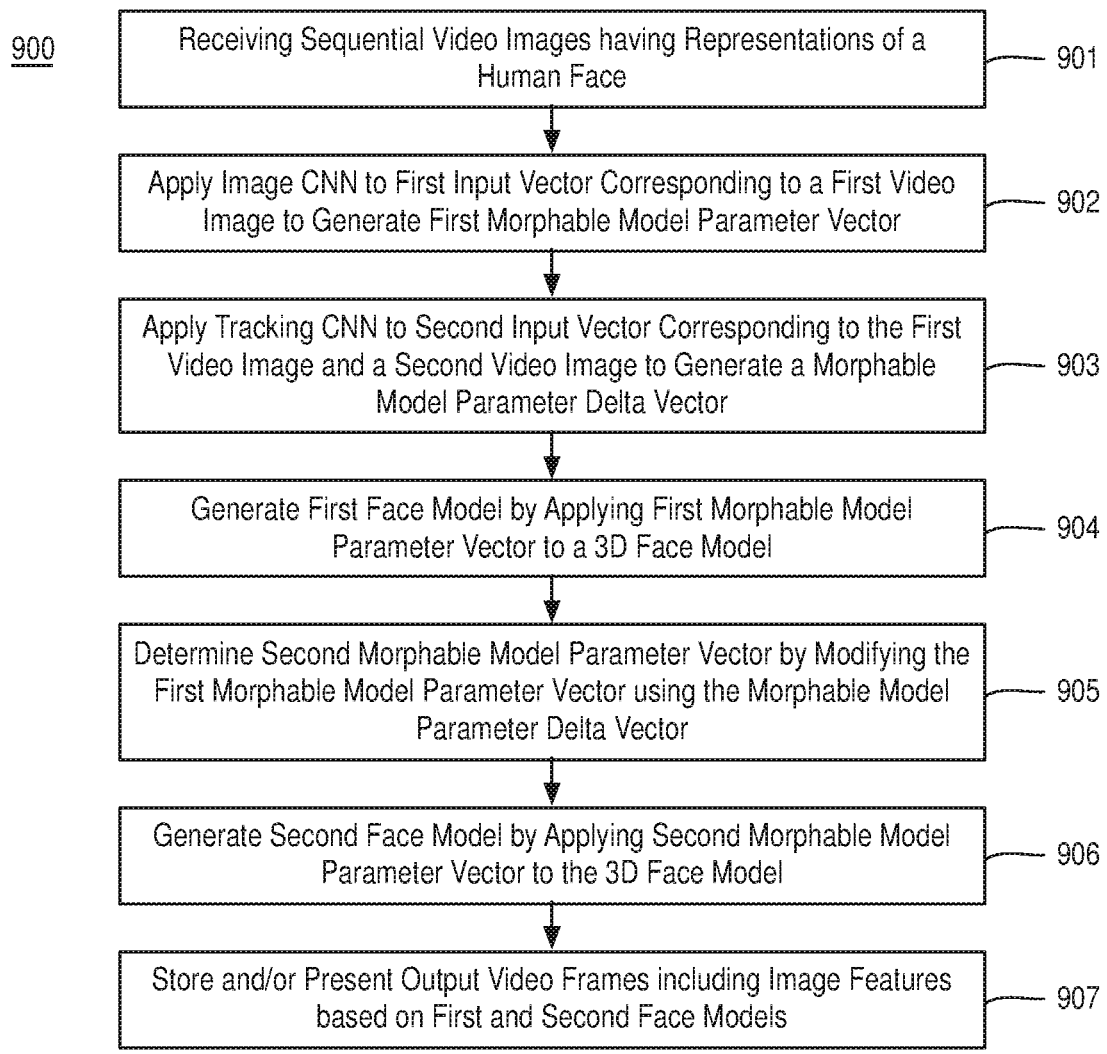
FIG. 9 is a flow diagram illustrating an example process for processing video.

FIG. 9 is a flow diagram illustrating an example process 900 for processing video, arranged in accordance with at least some implementations of the present disclosure. Process 900 may include one or more operations 901-907 as illustrated in FIG. 9. Process 900 may form at least part of a video processing technique. By way of non-limiting example, process 900 may form at least part of a processing technique performed by one or more of systems 100, 600, 700 as discussed herein. Furthermore, process 900 will be described herein with reference to system 1000 of FIG. 10.

Figure 10:
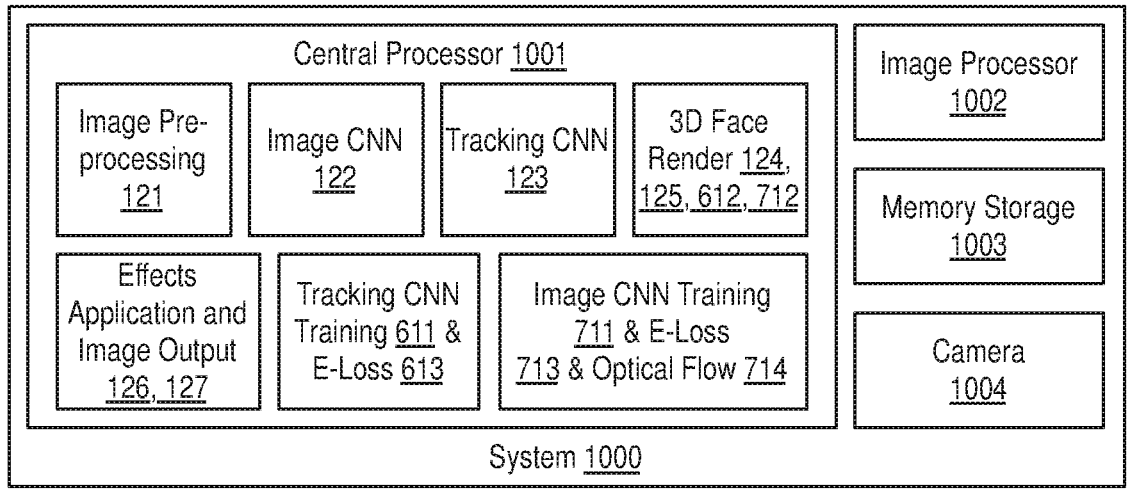
FIG. 10 is an illustrative diagram of an example system for processing video.

FIG. 10 is an illustrative diagram of an example system 1000 for processing video, arranged in accordance with at least some implementations of the present disclosure. As shown in FIG. 10, system 1000 may include a central processor 1001, an image processor 1002, a memory storage 1003, and a camera 1004. For example, camera 1004 and a display (not shown) may acquire input video for processing and display video modified based on 3D face models generated as discussed herein, respectively. Also as shown, central processor 1001 may include or implement image preprocessing module 121, image CNN 122, tracking CNN 123, one or more 3D face rendering modules 124, 125, 612, 712, one or more effects and image output modules 126, 127, image CNN training module 611 and loss measurement module 613, and tracking CNN training module 711 loss measurement module 713, and an optical flow module 714. In an embodiment, system 1000 implements only image preprocessing module 121, image CNN 122, tracking CNN 123, 3D face rendering modules 124, 125, and image output modules 126, 127 (i.e., in an implementation context). In an embodiment, system 1000 implements only image preprocessing module 121, image CNN training module 611, and loss measurement module 613 (i.e., in an image CNN training context). In an embodiment, system 1000 implements only tracking CNN training module 711 loss measurement module 713, and an optical flow module 714 (i.e., in a tracking CNN training context). Such components or modules may be implemented to perform operations as discussed herein. Memory storage 1003 may store images, image data, input vectors, output vectors, 3D model parameters, morphable model parameter vectors, morphable model parameter delta vectors, effects data, or any other data discussed herein.

As shown, in some examples, one or more of image preprocessing module 121, image CNN 122, tracking CNN 123, one or more 3D face rendering modules 124, 125, 612, 712, one or more effects and image output modules 126, 127, image CNN training module 611 and loss measurement module 613, and tracking CNN training module 711 loss measurement module 713, and an optical flow module 714 are implemented via central processor 1001. In other examples, one or more or portions of image preprocessing module 121, image CNN 122, tracking CNN 123, one or more 3D face rendering modules 124, 125, 612, 712, one or more effects and image output modules 126, 127, image CNN training module 611 and loss measurement module 613, and tracking CNN training module 711 loss measurement module 713, and an optical flow module 714 are implemented via image processor 1002, a video processor, a graphics processor, or the like. In yet other examples, one or more or portions of image preprocessing module 121, image CNN 122, tracking CNN 123, one or more 3D face rendering modules 124, 125, 612, 712, one or more effects and image output modules 126, 127, image CNN training module 611 and loss measurement module 613, and tracking CNN training module 711 loss measurement module 713, and an optical flow module 714 are implemented via an image or video processing pipeline or unit.

Image processor 1002 may include any number and type of graphics, image, or video processing units that may provide the operations as discussed herein. In some examples, image processor 1002 may be an image signal processor. Such operations may be implemented via software or hardware or a combination thereof. For example, image processor 1002 may include circuitry dedicated to manipulate frame data, image data, or video data obtained from memory storage 1003. Central processor 1001 may include any number and type of processing units or modules that may provide control and other high level functions for system 1000 and/or provide any operations as discussed herein. Memory storage 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory storage 1003 may be implemented by cache memory.

In an embodiment, one or more or portions of image preprocessing module 121, image CNN 122, tracking CNN 123, one or more 3D face rendering modules 124, 125, 612, 712, one or more effects and image output modules 126, 127, image CNN training module 611 and loss measurement module 613, and tracking CNN training module 711 loss measurement module 713, and an optical flow module 714 are implemented via an execution unit (EU) of image processor 1002. The EU may include, for example, programmable logic or circuitry such as a logic core or cores that may provide a wide array of programmable logic functions. In an embodiment, one or more or portions of image preprocessing module 121, image CNN 122, tracking CNN 123, one or more 3D face rendering modules 124, 125, 612, 712, one or more effects and image output modules 126, 127, image CNN training module 611 and loss measurement module 613, and tracking CNN training module 711 loss measurement module 713, and an optical flow module 714 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of image preprocessing module 121, camera and pose estimation module 132, contour determination and matching module 133, linear shape estimation module 134, texture estimation module 135, and shape refinement module 136 may be implemented via an application specific integrated circuit (ASIC). The ASIC may include an integrated circuitry customized to perform the operations discussed herein. Camera 1004 may include any camera having any suitable lens and image sensor and/or related hardware for capturing images or video.

Returning to discussion of FIG. 9, process 900 begins at operation 901, where sequential video images, frames, or pictures having a representation of a human face are received for processing. The sequential video images may be in any format and may be received locally from camera 1004 or from memory storage 1003 or from a remote device (not shown).

Processing continues at operation 902, where a first (image) CNN is applied to a first input vector corresponding to a first video image of the sequential video images to generate a first morphable model parameter vector. The first video image may be any video image of the sequential video images. In an embodiment, the first video image is the first video image of the sequential video images temporally. In an embodiment, the first video image is a scene change image or I-frame or the like. The first input vector may be any input vector for input to an image CNN discussed herein. In an embodiment, the first input vector includes chroma values for pixels of a first downscaled sub-region of the first video image. For example, the first downscaled sub-region may be a cropped and downscaled region including a representation of a human face. In an embodiment, process 900 further includes performing facial detection of the input images, cropping the images to a sub-region including the detected face, and downscaling the cropped region to a predefined pixel resolution. The first morphable model parameter vector and any other morphable model parameter vector discussed herein may include any suitable parameters for generating a face model from a 3D face model. In an embodiment, the morphable model parameter vector includes a concatenation of coefficients to modify a shape identity basis matrix of the 3D face model, coefficients to modify an expression identity basis matrix of the 3D face model, and coefficients to modify a texture identity basis matrix of the 3D face model. Optionally, the morphable model parameter vector may include additional parameters such as rotation parameters, translation parameters, a camera parameter, and illumination parameters.

Processing continues at operation 903, where a second (tracking) and separate CNN is applied to a second input vector corresponding to the first video image and a second video image of the plurality of sequential video images to generate a morphable model parameter delta vector. The second video image may be any video image temporally subsequent to the first video image such as an immediate temporally subsequent video image. The second input vector may be any input vector for input to a tracking CNN discussed herein. In an embodiment, the second input vector includes chroma values for pixels of the first downscaled sub-region of the first video image and chroma values for pixels of a second downscaled sub-region of the second video image. For example, the second downscaled sub-region may be a cropped and downscaled region including a representation of a human face in analogy to the first downscaled sub-region. In an embodiment, the second input vector includes the information of the first input vector (e.g., chroma values for pixels of a first downscaled sub-region) concatenated with the same data for the second input image (e.g., chroma values for pixels of a second downscaled sub-region). In an embodiment, the first and second input image are characterized as a pair of input images.

In an embodiment, process 900 further includes applying the second (tracking) CNN to a third input vector corresponding to the second video image and a third video image of the plurality of sequential video images to generate a second morphable model parameter delta vector such that the third input vector comprises the second chroma values (e.g., for the second input image) and third chroma values for third pixels of a third downscaled sub-region of a third video image. For example, the processing discussed with respect to operation 903 may be repeated for any number of subsequent image pairs (e.g., of temporally adjacent images). In an embodiment, each of the first, second, and third chroma values each include values for first, second, and third chroma channels of the input images such as RGB values. The morphable model parameter delta vector and any other morphable model parameter delta vector discussed herein may include any suitable parameters for modifying a morphable model parameter vector, which, after modification may be used to generate a face model from a 3D face model. In an embodiment, the morphable model parameter delta vector includes a concatenation of second coefficients to modify each of the coefficients modify the shape identity basis matrix, the coefficients to modify the expression identity basis matrix, and the coefficients to modify the texture identity basis matrix prior to application to the 3D face model. Optionally, the morphable model parameter delta vector may include additional parameters or coefficients or values to modify rotation parameters, translation parameters, a camera parameter, and illumination parameters.

Processing continues at operation 904, where a first face model of the human face is generated by applying the first morphable model parameter vector to a 3D face model. The 3D face model may include any model discussed herein such as the model discussed with respect to Equations (1), (2), and (3), or a portion thereof. For example, a 3D face model may be generated using fewer than all of the available modeling parameters (e.g., with shape only, with shape and albedo only, etc.). As used herein the term applying a morphable model parameter vector to a 3D face model indicates a 3D model is generated or rendered by implementing the morphable model parameter using the 3D face model. That is, the 3D face model (e.g., a 3DMM) is designed to be modified by coefficients or parameters implemented using a morphable model parameter vector.

Processing continues at operation 905, where a second morphable model parameter vector is determined by modifying the first morphable model parameter vector using the morphable model parameter delta vector generated at operation 902. The first morphable model parameter vector may be modified using the morphable model parameter delta vector using any suitable technique or techniques. In an embodiment, the morphable model parameter delta vector is added to the first morphable model parameter vector to generated the second morphable model parameter vector. In an embodiment, the morphable model parameter delta vector is subtracted from the first morphable model parameter vector to generated the second morphable model parameter vector. In an embodiment, the morphable model parameter delta vector and the first morphable model parameter vector are element-wise multiplied to generate the second morphable model parameter vector.

Processing continues at operation 906, where a second face model of the human face is generated by applying the second morphable model parameter vector to a 3D face model. As discussed with respect to operation 905, the 3D face model may include any model discussed herein.

Processing continues at operation 907, where output video images including image features based at least in part on the first and second face models are stored to memory, presented via a display, transmitted to another device, etc. The image features may be based at least in part on the first and second face models in any suitable manner. In an embodiment, the image features are provided at a particular location in the output images using a particular location (e.g., nose, ear, etc.) of the first and second face models. In an embodiment, the image feature comprises a rendition of the face models (e.g., a photo-realistic rendering, a rendering having a substituted texture or texture portion, a rendering having a modification of the shape of the face model, etc.). In an embodiment, the image features are applied to modify the input images. In an embodiment, the image features are a portion of a newly generated output image. In an embodiment, process 900 further includes applying an effect to at least one of the first or second face models prior to storing, presenting, or storing the output video images.

In an embodiment, process 900 further includes pre-training the first (image) CNN by generating a plurality of training input vectors based on training images each comprising a representation of a human face such that each of the training input vectors comprises chroma values for a region of a training image comprising the human face, iteratively applying the first CNN to the plurality of training input vectors to generate a corresponding plurality of morphable model parameter vectors, rendering resultant output images by applying the plurality of morphable model parameter vectors to the 3D face model, and minimizing a cost function comprising a measure of photometric alignment between the training images and the resultant output images and a measure to constrain the morphable model parameter vectors. In an embodiment, the pre-training includes self-supervised training such that the training video images comprise unlabeled images.

In an embodiment, process 900 further includes pre-training the second (tracking) CNN by generating a plurality of training input vectors based on training video images each comprising a representation of a human face such that each of the training input vectors comprises first chroma values for a first region of a first particular training video image and second chroma values for a second region of a second particular training video image temporally subsequent to the first particular training video image, iteratively applying the second CNN to the plurality of training input vectors to generate a corresponding plurality of morphable model parameter delta vectors, rendering a first resultant output image by applying a morphable model parameter vector adjusted using a morphable model parameter delta vector to the 3D face model, and minimizing a cost function comprising a measure of photometric alignment between a training video image and the first resultant output image and a measure of temporal coherence between the first resultant output image and a prior temporal resultant output image. In an embodiment, the measure of temporal coherence includes a per-pixel difference color difference between the first resultant output image and the prior temporal resultant output image based on a per-pixel correspondence between the first resultant output image and the prior temporal resultant output image generated based on optical flow detection of the first and second particular training video images.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
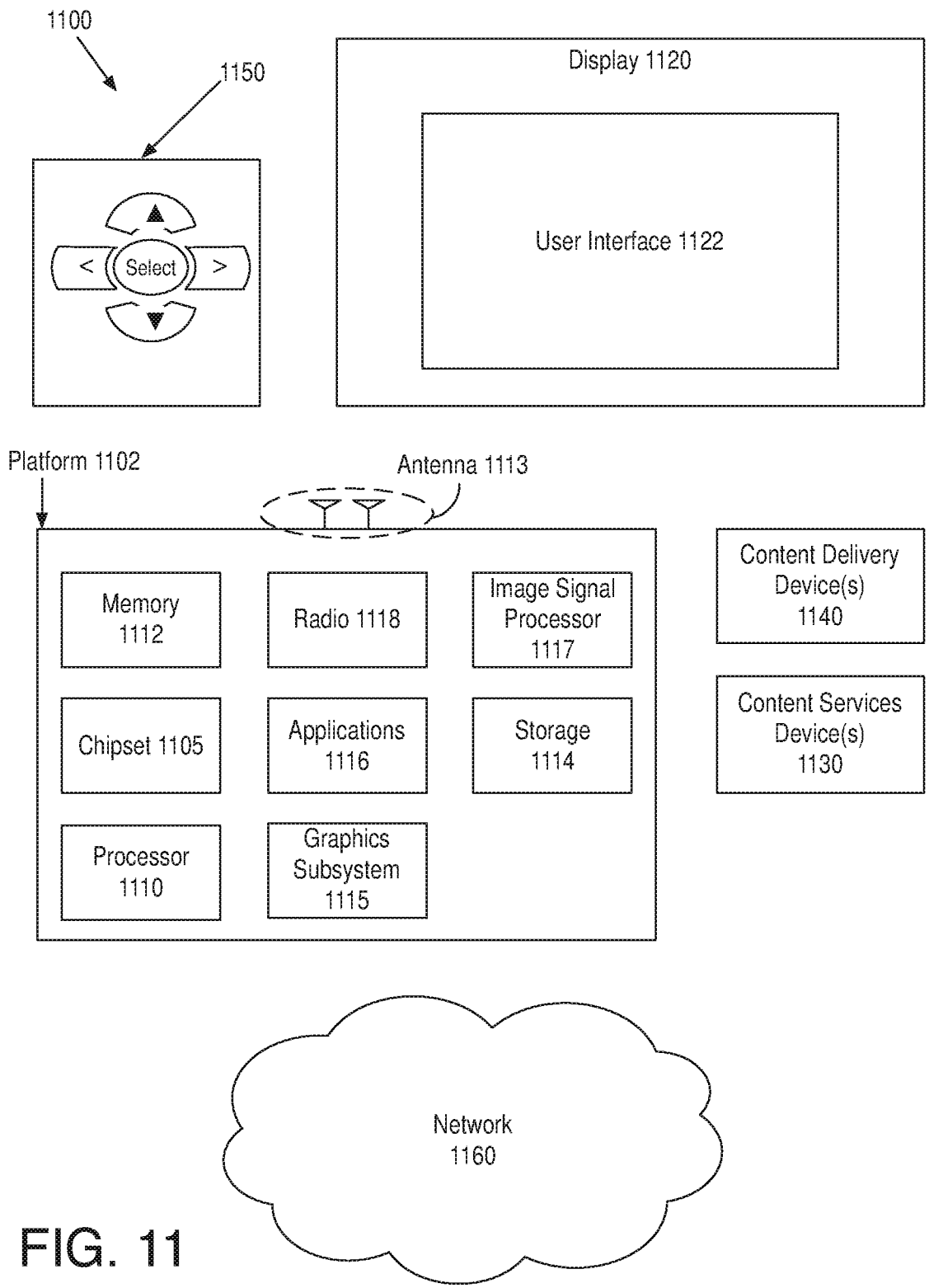
FIG. 11 is an illustrative diagram of an example system.

FIG. 11 is an illustrative diagram of an example system 1100, arranged in accordance with at least some implementations of the present disclosure. In various implementations, system 1100 may be a mobile system although system 1100 is not limited to this context. System 1100 may implement and/or perform any modules or techniques discussed herein. For example, system 1100 may be incorporated into a personal computer (PC), server, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 1100 may be implemented via a cloud computing environment.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Image signal processor 1117 may be implemented as a specialized digital signal processor or the like used for image or video frame processing. In some examples, image signal processor 1117 may be implemented based on a single instruction multiple data or multiple instruction multiple data architecture or the like. In some examples, image signal processor 1117 may be characterized as a media processor. As discussed herein, image signal processor 1117 may be implemented based on a system on a chip architecture and/or based on a multi-core architecture.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/or display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of navigation controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, navigation controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
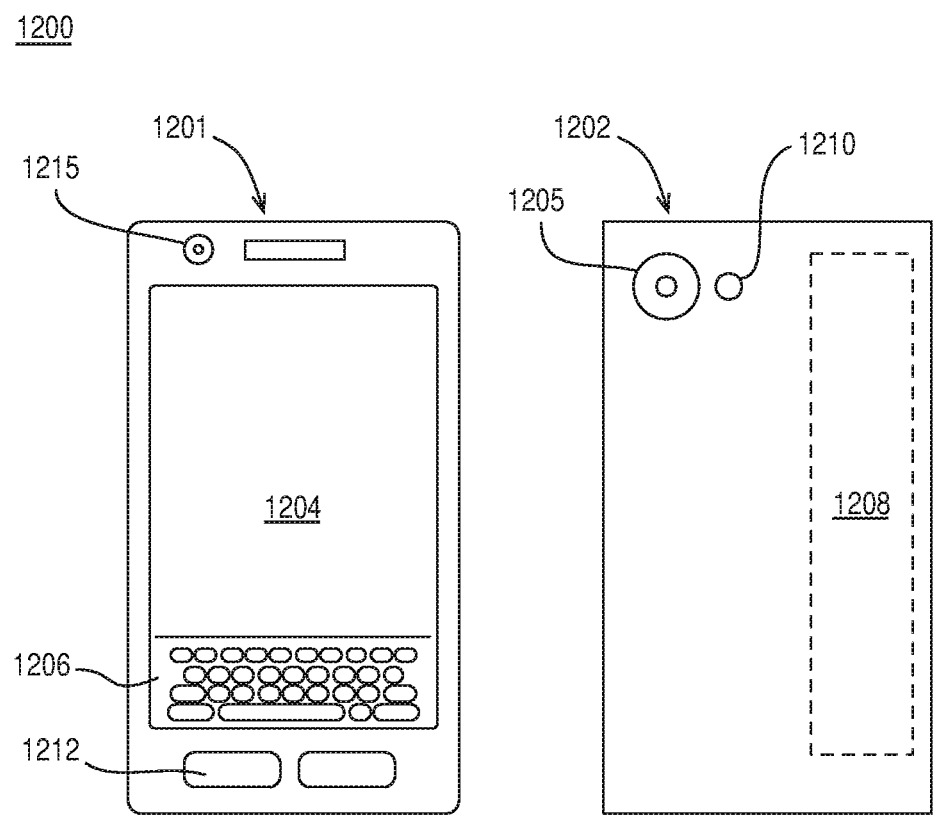
FIG. 12 illustrates an example small form factor device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, other systems discussed herein or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, camera 1215, a camera 1205, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include camera 1205 and a flash 1210 integrated into back 1202 (or elsewhere) of device 1200 and camera 1215 integrated into front 1201 of device 1200. In some embodiments, either or both of cameras 1215, 1205 may be moveable with respect to display 1204. Camera 1215 and/or camera 1205 may be components of an imaging module or pipeline to originate color image data processed into streaming video that is output to display 1204 and/or communicated remotely from device 1200 via antenna 1208 for example. For example, camera 1215 may capture input images and eye contact corrected images may be provided to display 1204 and/or communicated remotely from device 1200 via antenna 1208.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A machine based method for video processing comprising:
    receiving a plurality of sequential video images comprising representations of a human face;
    applying a first convolutional neural network (CNN) to a first input vector corresponding to a first video image of the plurality of sequential video images to generate a first morphable model parameter vector;
    applying a second CNN to a second input vector having chroma or luma or both image data of both the first video image and a second video image in sequence with the first video image in the plurality of sequential video images to generate a morphable model parameter delta vector;
    generating a first face model of the human face by applying the first morphable model parameter vector to a 3D face model;
    determining a second morphable model parameter vector by modifying the first morphable model parameter vector using the morphable model parameter delta vector;
    generating a second face model of the human face by applying the second morphable model parameter vector to the 3D face model; and
    storing or presenting output video images comprising image features based at least in part on the first and second face models.

2. The method of claim 1, wherein the first input vector comprises first chroma values for first pixels of a first downscaled sub-region of the first video image and the second input vector comprises the first chroma values and second chroma values for second pixels of a second downscaled sub-region of the second video image.

3. The method of claim 2, further comprising:
    applying the second CNN to a third input vector corresponding to the second video image and a third video image of the plurality of sequential video images to generate a second morphable model parameter delta vector, wherein the third input vector comprises the second chroma values and third chroma values for third pixels of a third downscaled sub-region of the second video image, wherein each of the first, second, and third chroma values each comprise values for first, second, and third chroma channels.

4. The method of claim 1, wherein the first morphable model parameter vector comprises a concatenation of coefficients to modify a shape identity basis matrix of the 3D face model, coefficients to modify an expression identity basis matrix of the 3D face model, coefficients to modify a texture identity basis matrix of the 3D face model, coefficients for camera and pose transformation, and illumination coefficients.

5. The method of claim 4, wherein the morphable model parameter delta vector comprises a concatenation of second coefficients to modify each of the coefficients to modify the shape identity basis matrix, the coefficients to modify the expression identity basis matrix, the coefficients to modify the texture identity basis matrix prior to application to the 3D face model, the coefficients for camera and pose transformation, and the illumination coefficients.

6. The method of claim 1, further comprising:
    applying an effect to at least one of the first or second face models prior to said storing or presenting the output video images.

7. The method of claim 1, further comprising:
    pre-training the first CNN by:
        generating a plurality of training input vectors based on training images each comprising a representation of a human face, wherein each of the training input vectors comprises chroma values for a region of a training image comprising the human face;
        iteratively applying the first CNN to the plurality of training input vectors to generate a corresponding plurality of morphable model parameter vectors;
        rendering resultant output images by applying the plurality of morphable model parameter vectors to the 3D face model; and
        minimizing a cost function comprising a measure of photometric alignment between the training images and the resultant output images and a measure to constrain the morphable model parameter vectors.

8. The method of claim 7, wherein said pre-training comprises self-supervised training wherein the training video images comprise unlabeled images.

9. The method of claim 1, further comprising:
    pre-training the second CNN by:
        generating a plurality of training input vectors based on training video images each comprising a representation of a human face, wherein each of the training input vectors comprises first chroma values for a first region of a first particular training video image and second chroma values for a second region of a second particular training video image temporally subsequent to the first particular training video image;
        iteratively applying the second CNN to the plurality of training input vectors to generate a corresponding plurality of morphable model parameter delta vectors;
        rendering a first resultant output image by applying a morphable model parameter vector adjusted using a morphable model parameter delta vector to the 3D face model; and
        minimizing a cost function comprising a measure of photometric alignment between a training video image and the first resultant output image and a measure of temporal coherence between the first resultant output image and a prior temporal resultant output image.

10. The method of claim 9, wherein the measure of temporal coherence comprises a per-pixel difference color difference between the first resultant output image and the prior temporal resultant output image based on a per-pixel correspondence between the first resultant output image and the prior temporal resultant output image generated based on optical flow detection of the first and second particular training video images.

11. A system comprising:
a memory to store a plurality of sequential video images; and
a processor coupled to the memory, the processor to:
apply a first convolutional neural network (CNN) to a first input vector corresponding to a first video image of the plurality of sequential video images to generate a first morphable model parameter vector;
apply a second CNN to a second input vector having chroma or luma or both image data of both the first video image and a second video image in sequence with the first video image in the plurality of sequential video images to generate a morphable model parameter delta vector;
generate a first face model of the human face by applying the first morphable model parameter vector to a 3D face model;
determine a second morphable model parameter vector by modifying the first morphable model parameter vector using the morphable model parameter delta vector;
generate a second face model of the human face by applying the second morphable model parameter vector to the 3D face model; and
transmit output video images comprising image features based at least in part on the first and second face models for storage or presentment.

12. The system of claim 11, wherein the first input vector comprises first chroma values for first pixels of a first downscaled sub-region of the first video image and the second input vector comprises the first chroma values and second chroma values for second pixels of a second downscaled sub-region of the second video image.

13. The system of claim 12, the processor further to:
apply the second CNN to a third input vector representative of the second video image and a third video image of the plurality of sequential video images to generate a second morphable model parameter delta vector, wherein the third input vector comprises the second chroma values and third chroma values for third pixels of a third downscaled sub-region of the second video image, wherein each of the first, second, and third chroma values each comprise values for first, second, and third chroma channels.

14. The system of claim 11, wherein the first morphable model parameter vector comprises a concatenation of coefficients to modify a shape identity basis matrix of the 3D face model, coefficients to modify an expression identity basis matrix of the 3D face model, coefficients to modify a texture identity basis matrix of the 3D face model, coefficients for camera and pose transformation, and illumination coefficients.

15. The system of claim 14, wherein the morphable model parameter delta vector comprises a concatenation of second coefficients to modify each of the coefficients to modify the shape identity basis matrix, the coefficients to modify the expression identity basis matrix, the coefficients to modify the texture identity basis matrix prior to application to the 3D face model, the coefficients for camera and pose transformation, and the illumination coefficients.

16. At least one non-transitory machine readable medium comprising a plurality of instructions that, in response to being executed on a device, cause the device to process video by:
receiving a plurality of sequential video images comprising representations of a human face;
applying a first convolutional neural network (CNN) to a first input vector corresponding to a first video image of the plurality of sequential video images to generate a first morphable model parameter vector;
applying a second CNN to a second input vector having chroma or luma or both image data of both the first video image and a second video image in sequence with the first video image in the plurality of sequential video images to generate a morphable model parameter delta vector;
generating a first face model of the human face by applying the first morphable model parameter vector to a 3D face model;
determining a second morphable model parameter vector by modifying the first morphable model parameter vector using the morphable model parameter delta vector;
generating a second face model of the human face by applying the second morphable model parameter vector to the 3D face model; and
storing or presenting output video images comprising image features based at least in part on the first and second face models.

17. The machine readable medium of claim 16, wherein the first input vector comprises first chroma values for first pixels of a first downscaled sub-region of the first video image and the second input vector comprises the first chroma values and second chroma values for second pixels of a second downscaled sub-region of the second video image.

18. The machine readable medium of claim 17, further comprising instructions that, in response to being executed on a device, cause the device to process video by:
applying the second CNN to a third input vector representative of the second video image and a third video image of the plurality of sequential video images to generate a second morphable model parameter delta vector, wherein the third input vector comprises the second chroma values and third chroma values for third pixels of a third downscaled sub-region of the second video image, wherein each of the first, second, and third chroma values each comprise values for first, second, and third chroma channels.

19. The machine readable medium of claim 16, wherein the first morphable model parameter vector comprises a concatenation of coefficients to modify a shape identity basis matrix of the 3D face model, coefficients to modify an expression identity basis matrix of the 3D face model, coefficients to modify a texture identity basis matrix of the 3D face model, coefficients for camera and pose transformation, and illumination coefficients.

20. The machine readable medium of claim 19, wherein the morphable model parameter delta vector comprises a concatenation of second coefficients to modify each of the coefficients modify the shape identity basis matrix, the coefficients to modify the expression identity basis matrix, the coefficients to modify the texture identity basis matrix prior to application to the 3D face model, the coefficients for camera and pose transformation, and the illumination coefficients.

* * * * *